US006476983B2

(12) United States Patent
Kodama et al.

(10) Patent No.: US 6,476,983 B2
(45) Date of Patent: Nov. 5, 2002

(54) EYEPIECE LENS, OBJECTIVE LENS, AND OPTICAL APPARATUS HAVING THEM

(75) Inventors: Hiroyuki Kodama, Tokyo; Saburo Sugawara, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/726,523

(22) Filed: Dec. 1, 2000

(65) Prior Publication Data

US 2001/0004301 A1 Jun. 21, 2001

(30) Foreign Application Priority Data

Dec. 7, 1999 (JP) .......................... 11-347348
Dec. 7, 1999 (JP) .......................... 11-347349

(51) Int. Cl.⁷ ................... G02B 9/04; G02B 9/12; G02B 21/02
(52) U.S. Cl. ................ 359/795; 359/661; 359/791
(58) Field of Search ........................ 359/656–661, 359/754–756, 763, 771, 791, 784–785, 795

(56) References Cited

U.S. PATENT DOCUMENTS

| 5,134,524 A | 7/1992 | Hamano et al. ............ 359/687 |
| 5,247,393 A | 9/1993 | Sugawara .................. 359/690 |
| 5,255,121 A | 10/1993 | Suzuki ..................... 359/643 |
| 5,257,134 A | 10/1993 | Sugawara .................. 359/679 |
| 5,303,088 A | 4/1994 | Sugawara .................. 359/753 |
| 5,341,243 A | 8/1994 | Okuyama et al. ........... 359/687 |
| 5,550,679 A | 8/1996 | Sugawara .................. 359/689 |
| 5,552,938 A | 9/1996 | Sugawara .................. 359/691 |
| 5,600,490 A | 2/1997 | Sugawara et al. .......... 359/690 |
| 5,684,635 A | 11/1997 | Sugawara .................. 359/643 |
| 5,701,475 A | 12/1997 | Sugawara .................. 359/644 |
| 5,748,380 A | 5/1998 | Yanari ..................... 359/646 |
| 5,757,553 A | 5/1998 | Sugawara .................. 359/643 |
| 5,774,272 A * | 6/1998 | Watanabe .................. 359/660 |
| 5,781,349 A | 7/1998 | Sugawara .................. 359/691 |
| 5,920,433 A | 7/1999 | Sugawara .................. 359/663 |
| 5,926,316 A | 7/1999 | Sugawara .................. 359/557 |
| 5,940,220 A * | 8/1999 | Suenaga et al. ........... 359/660 |
| 5,969,873 A | 10/1999 | Sugawara .................. 359/645 |
| 5,969,875 A | 10/1999 | Sugawara .................. 359/651 |
| 5,973,847 A | 10/1999 | Sugawara .................. 359/644 |
| 5,986,806 A | 11/1999 | Sugawara .................. 359/557 |
| 6,008,949 A | 12/1999 | Sugawara .................. 359/644 |

FOREIGN PATENT DOCUMENTS

| JP | 63-55045 | 11/1988 |
| JP | 05-119273 | 5/1993 |
| JP | 09-090246 | 4/1997 |

* cited by examiner

Primary Examiner—Jordan M. Schwartz
(74) Attorney, Agent, or Firm—Fitzpatrick, Cella, Harper & Scinto

(57) ABSTRACT

An eyepiece lens is constructed with, in order from an entrance side for light to an exit side for light, first, second, third, fourth and fifth lens units of negative, positive, positive, positive and positive refractive powers, respectively. Each of the first, second, third, fourth and fifth lens units of the eyepiece lens is composed only of one lens or a cemented lens, and an intermediate image by an objective lens is formed between the second lens unit and the third lens unit. An objective lens is constructed with, in order from an object side to an image side, first and second lens units of positive and negative refractive powers, respectively. The first and second lens units of the objective lens are composed of one positive lens and of one positive lens and one negative lens, respectively, and the various conditions are appropriately set. An optical apparatus includes the eyepiece lens, the objective lens and an erecting prism.

16 Claims, 23 Drawing Sheets

EYEPIECE LENS, OBJECTIVE LENS, AND OPTICAL APPARATUS HAVING THEM

BACKGROUND OF THE INVENTION

1. Field of the Invention

The present invention relates to an objective lens (a photographic lens) for use in an optical apparatus, such as a telescope, a microscope or a binocular, an eyepiece lens adapted for observing an object image formed by the objective lens, and a telescope or a binocular (an observing optical system) using the objective lens and the eyepiece lens.

2. Description of Related Art

An observing optical system, such as a telescope or a binocular, is provided with an eyepiece lens for making a real image formed by an objective lens observable as an enlarged virtual image. When the observer views the virtual image, a field of view observable by the observer is enlarged according to the magnification of the observing optical system defined by the ratio of the focal length of the objective lens to the focal length of the eyepiece lens. Accordingly, the eyepiece lens is required to have the various aberrations, particularly, curvature of field, lateral chromatic aberration and coma, corrected in an observable apparent field of view.

Further, it is desired in the observing optical system that the eye relief (the distance from the last lens surface to the eye point) is sufficiently long in such a way as to enable the observer to observe an image with spectacles on.

In Japanese Laid-Open Patent Application No. Hei 09-090246 (corresponding to U.S. Pat. No. 5,748,380), there is proposed an eyepiece lens in which an apparent field of view is 60° or more and the eye relief is longer than the focal length of the whole eyepiece lens.

In the eyepiece lens proposed in the above Japanese Laid-Open Patent Application No. Hei 09-090246, a negative cemented lens is disposed on the object side of an intermediate image of an objective lens, and a positive cemented lens and a plurality of positive lenses are disposed on the observer side of the intermediate image, for the purpose of correcting the various aberrations while keeping the eye relief long.

In addition, for example, in Japanese Laid-Open Patent Application No. Hei 05-119273 (corresponding to U.S. Pat. No. 5,255,121), there is disclosed an eyepiece lens having the eye relief sufficiently secured and the various aberrations corrected well. This eyepiece lens, although having a sufficiently wide angle of view and the various aberrations corrected well, is designed for use in a microscope and, therefore, has the long focal length and also the long total length.

In general, in an eyepiece lens, if an apparent field of view is widened to a visual angle of 60° or thereabout and a compact lens arrangement is adopted while enlarging the distance from the eyepiece lens to the pupil position of the observer (eye relief or eye distance), the number of refractive lens surfaces having convergency relative to an off-axial principal ray would increase, so that it becomes difficult to correct the various aberrations well to obtain high optical performance.

For example, in the case of an eyepiece lens according to numerical example 1 set forth in the above-mentioned Japanese Laid-Open Patent Application No. Hei 09-090246, curvature of field, if reduced to aberration in an afocal system, becomes +1.5 Dptr (diopter) with regard to a sagittal plane and −3 Dptr with regard to a meridional plane at the most marginal portion of a field of view, and astigmatism becomes 4 Dptr. Therefore, in a case where the eyepiece lens is used for the actual observing optical system, when the observer brings a central part of an observation object into focus, the observer would sense image blurring or image flowing at the marginal portion of a field of view. Further, the total length of the eyepiece lens is such large as six times the focal length of the entire eyepiece lens.

In general, it is very difficult to obtain an eyepiece lens capable of, while securing the sufficient eye relief, correcting aberration sufficiently and reducing the total lens length, i.e., making the reduction in size and the high optical performance compatible with each other.

In the meantime, in general, an objective lens for use in a telescope, a binocular or the like is required, at the time of designing, to have the various aberrations, such as spherical aberration, chromatic aberration and coma, suppressed to sufficient small degrees.

FIGS. 30 and 31 are sectional views respectively showing optical systems of objective lenses which are generally used, as viewed in such a way as to include an optical axis.

In FIG. 30, reference numeral 7 denotes an objective lens, reference numeral 8 denotes an erecting prism serving as an image inverting means, reference numeral 9 denotes an optical axis, and reference numeral 10 denotes an image plane on which an object image is formed by the objective lens 7. As shown in FIG. 30, the objective lens 7 is composed of a combination of a positive lens 7a and a negative lens 7b. This arrangement is adopted for the purpose of utilizing the difference in dispersion between glass materials of the respective lenses so as to correct the various aberrations, particularly, longitudinal chromatic aberration and spherical aberration, which appear along the optical axis.

The objective lens shown in FIG. 31 is an example of the so-called telephoto type, in which a negative lens unit 12 is disposed behind a positive lens unit 11. In FIG. 31, in addition to the positive lens unit 11 and the negative lens unit 12, reference numeral 13 denotes an erecting prism, reference numeral 14 denotes an optical axis, and reference numeral 15 denotes an image plane.

In a case where an objective lens is intended to have much higher optical performance, particularly, to correct well chromatic aberration, which appears along the optical axis, so as to have high optical performance, a glass material having a large Abbe number (low dispersion) and having extraordinary dispersion is used as the material of a positive lens constituting a part of the objective lens. As such a glass material having extraordinary dispersion, there are, by way of example, s-FPL51 (trade name) manufactured by K. K. OHARA, FK01 (trade name) manufactured by SHOTT Inc., etc. With such a glass material adopted, it is possible to improve chromatic aberration, etc., greatly.

Further, the magnification of a binocular or a telescope is determined by the ratio of the focal length of the objective lens to the focal length of the eyepiece lens. Accordingly, in order to increase the magnification of the binocular or the telescope, there are adopted a method of lengthening the focal length of the objective lens or a method of shortening the focal length of the eyepiece lens. In the case of the method of shortening the focal length of the eyepiece lens, the diameter of an exit pupil would be decreased.

In a case where the focal length of the objective lens is lengthened with the same lens construction kept, the total length of the objective lens would be increased by the amount of the focal length. In order to lengthen the focal length and shorten the total length, there is, in many cases, adopted the so-called telephoto type, in which a negative lens unit is disposed behind a positive lens unit.

As such a telephoto type, there is an ultratelephoto objective lens disclosed in Japanese Patent Publication No. Sho 63-55045, which is an objective lens having an aperture ratio of 1:7 or thereabout.

In a case where such a telephoto type is used for the objective lens, since a positive lens included in the first lens unit has a large refractive power, longitudinal chromatic aberration tends to occur more greatly. In general, in order to suppress this chromatic aberration, there is adopted a method of using a glass material having extraordinary low dispersion.

The ultratelephoto objective lens disclosed in Japanese Patent Publication No. Sho 63-55045 is so relatively dark as to have an aperture ratio of 1:7 or thereabout. If an objective lens is used for a binocular and the binocular is intended to be reduced in size, the objective lens is desirable to be a brighter lens system. Further, if the objective lens is intended to be reduced in size, it is preferable to adopt a telephoto-type optical system for the objective lens. In this instance, in order to lengthen the focal length of the objective lens, the second lens unit of negative refractive power is disposed at a distance from the first lens unit of positive refractive power.

In such a lens construction, the sensitivity due to the decentration of lenses becomes high, so that a structural arrangement for holding the lenses is required to have high accuracy. Further, if a lens system is intended to be reduced in size by strengthening a refractive power of each lens unit, the occurrence of the various aberrations would become large, causing such a tendency as to lower optical performance.

BRIEF SUMMARY OF THE INVENTION

In view of the above conventional arrangement, it is a first object of the invention to provide a small-sized eyepiece lens capable of correcting well the various aberrations over the entire observation filed of view to obtain a high-image-quality observation image, while having an apparent visual angle, i.e., a wide field of view, and, moreover, having a long eye distance.

Further, it is a second object of the invention to provide an objective lens having such a small F-number as to be adapted for a telescope or a binocular, and capable of correcting well the various aberrations to obtain good optical performance, while reducing the size of a lens system.

To attain the above objects, in accordance with an aspect of the invention, there is provided an eyepiece lens, which comprises, in order from an entrance side for light to an exit side for light, a first lens unit of negative refractive power, the first lens unit consisting of one negative lens having a concave surface facing the entrance side, which is stronger in refractive power than a surface thereof facing the exit side, a second lens unit of positive refractive power, the second lens unit consisting of one positive meniscus lens having a convex surface facing the exit side, a third lens unit of positive refractive power, the third lens unit consisting of a cemented lens of meniscus form having a convex surface facing the exit side and of positive refractive power as a whole, a fourth lens unit of positive refractive power, the fourth lens unit consisting of a positive lens having a surface facing the exit side which is stronger in refractive power than a surface thereof facing the entrance side, and a fifth lens unit of positive refractive power, the fifth lens unit having a surface facing the entrance side which is stronger in refractive power than a surface thereof facing the exit side, wherein an intermediate image by an objective lens is formed between the second lens unit and the third lens unit.

In addition, in accordance with another aspect of the invention, there is provided an objective lens, which comprises, in order from an object side to an image side, a first lens unit of positive refractive power, the first lens unit consisting of one positive lens, and a second lens unit of negative refractive power, the second lens unit consisting of one positive lens and one negative lens, wherein the objective lens satisfies the following conditions:

$0.5 \leq f1o/fo \leq 0.9$ $1.1 \leq -f2o/fo \leq 2.5$ $0.1 \leq D12o/fo \leq 0.2$ where fo is the focal length of the entire objective lens, f1o is the focal length of the first lens unit, f2o is the focal length of the second lens unit, and D12o is an interval between the first lens unit and the second lens unit.

In addition, in accordance with a further aspect of the invention, there is provided an objective lens, which comprises, in order from an object side to an image side, a first lens unit of positive refractive power, the first lens unit consisting of one positive lens, a second lens unit of negative refractive power, the second lens unit consisting of one positive lens and one negative lens, and an erecting prism for erecting an image, wherein the objective lens satisfies the following conditions:

$0.5 \leq f1o/fo \leq 0.9$ $1.1 \leq -f2o/fo \leq 2.5$ $1.6 \leq Np$ where fo is the focal length of the entire objective lens, f1o is the focal length of the first lens unit, f2o is the focal length of the second lens unit, and Np is a refractive index of material of the erecting prism.

In addition, in accordance with a still further aspect of the invention, there is provided an optical apparatus, such as a telescope or a binocular, which comprises the eyepiece lens or the objective lens according to the above aspects.

In addition, in accordance with a still further aspect of the invention, there is provided a binocular, which comprises, in order from an entrance side for light to an exit side for light, a pair of objective lenses, the pair of objective lenses respectively forming images, a pair of erecting prisms, the pair of erecting prisms erecting the images formed respectively by the pair of objective lenses, and a pair of eyepiece lenses, the pair of eyepiece lenses being provided for observing the images erected respectively by the pair of erecting prisms, wherein the binocular satisfies the following condition:

$1.6 < Nep$ where Nep is a refractive index of material of the pair of erecting prisms.

These and further objects and features of the invention will become apparent from the following detailed description of preferred embodiments thereof taken in conjunction with the accompanying drawings.

DETAILED DESCRIPTION OF THE INVENTION

Figure 1:
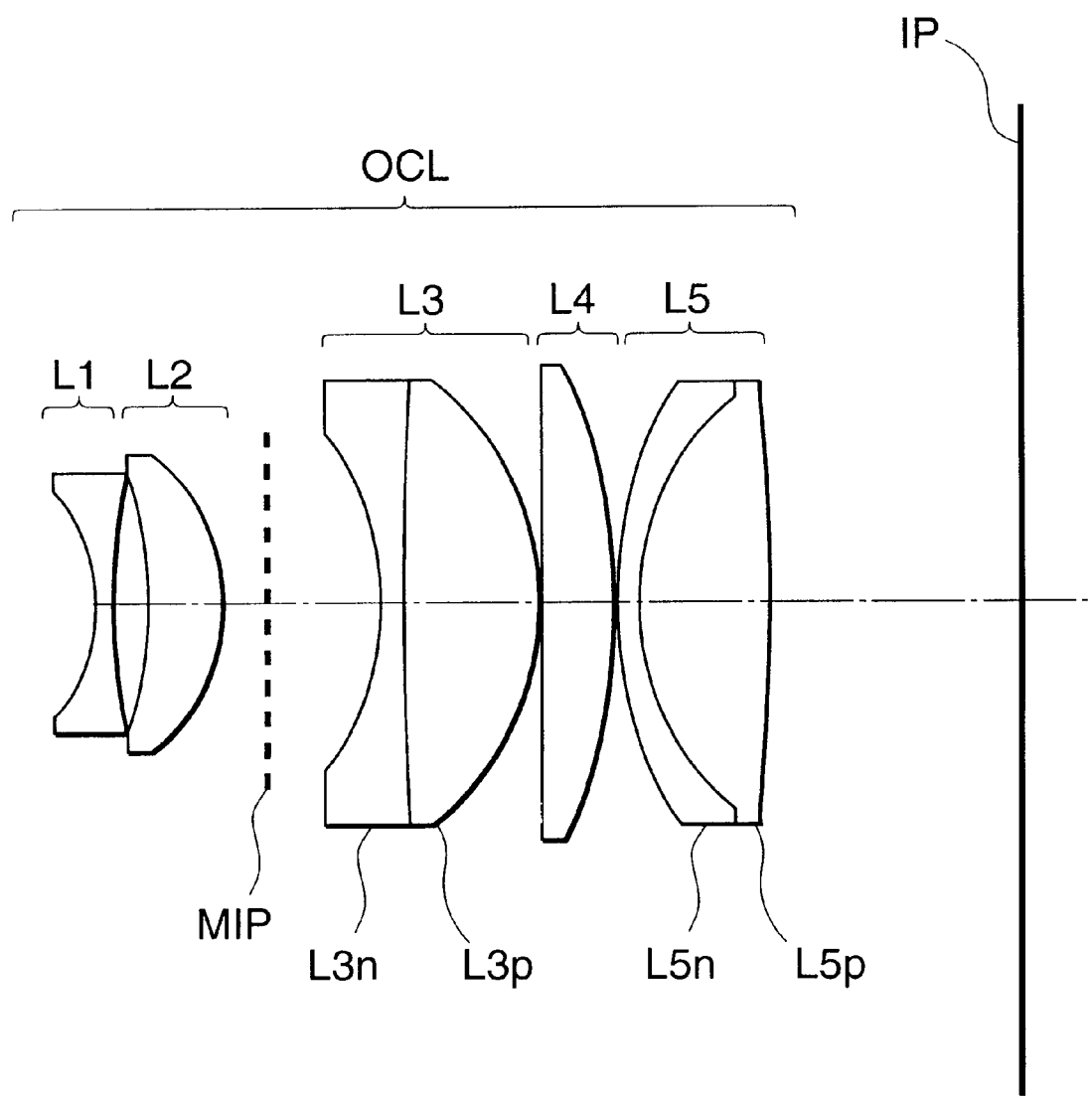
FIG. 1 is a lens sectional view showing an eyepiece lens according to a numerical example 1 of the invention.
Figure 2:
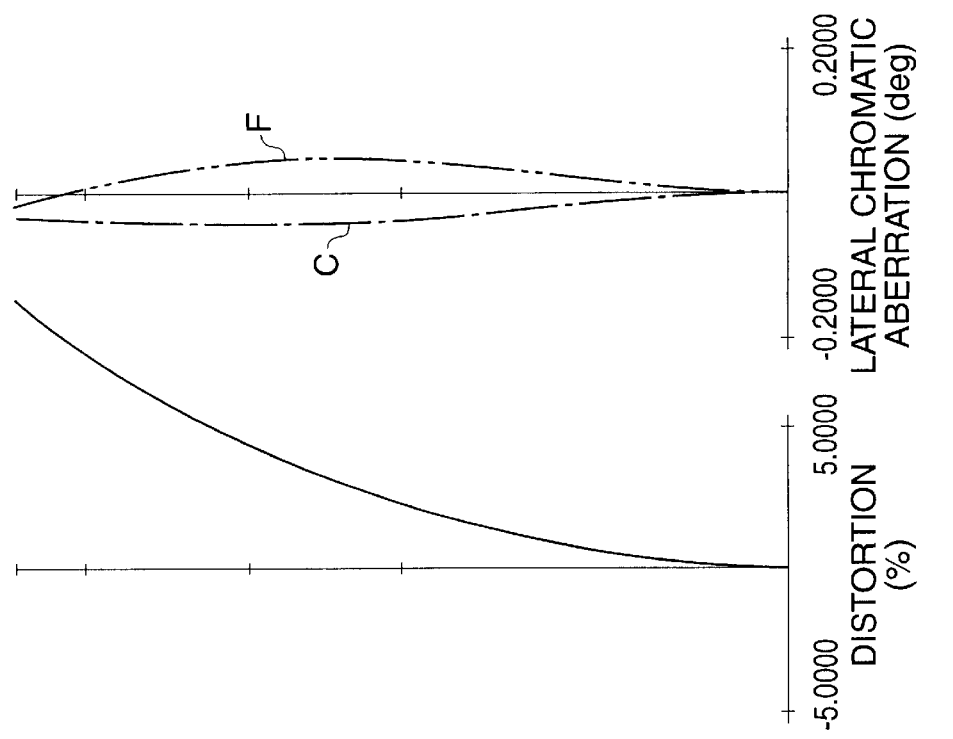
FIGS. 2A to 2D are aberration diagrams showing the various aberrations, in an afocal system, occurring in the eyepiece lens according to the numerical example 1.

Hereinafter, preferred embodiments of the invention will be described in detail with reference to the drawings.

(First Embodiment)

First, an eyepiece lens according to a first embodiment of the invention is described below. FIGS. 1, 3, 5, 7, 9 and 11 are lens sectional views respectively showing eyepiece lenses set forth in numerical examples 1 to 6 (to be described later) corresponding to the first embodiment.

In each of the lens sectional views shown in FIGS. 1, 3, 5, 7, 9 and 11, reference character OCL denotes an eyepiece lens, and reference character IP denotes an eye point (observation position).

The eyepiece lens according to the first embodiment is constructed with, in order from the entrance side for light to the exit side for light, a first lens unit L1 consisting of one negative lens having a concave surface facing the entrance side, which is stronger in negative refractive power than a surface thereof facing the exit side, a second lens unit L2 consisting of one positive meniscus lens having a convex surface facing the exit side, being followed by an intermediate image position MIP, a third lens unit L3 consisting of a cemented lens of meniscus form having a convex surface facing the exit side and of positive refractive power as a whole, a fourth lens unit L4 consisting of a positive lens having a surface facing the exit side which is stronger in positive refractive power than a surface thereof facing the entrance side, and a fifth lens unit L5 having a surface facing the entrance side which is stronger in refractive power than a surface thereof facing the exit side.

With the above lens construction adopted, the eyepiece lens according to the first embodiment, although having such a very wide apparent field of view as 66° or thereabout, has all the aberrations corrected well and has the eye relief longer than the focal length of the entire eyepiece lens. Further, the total length of the eyepiece lens is of the order of three times to four times the focal length of the entire eyepiece lens, so that a great reduction in size of the eyepiece lens is realized as against the conventional design example. Accordingly, if the eyepiece lens according to the first embodiment is applied to a telescope or a microscope, it is possible to realize a small-sized and very high-performance observing optical apparatus.

The eyepiece lens according to the first embodiment satisfies the various aberrations which will be described below. In order to attain the above-mentioned first object of the invention, it is preferable to satisfy at least one of the following conditions.

(A-1) The fifth lens unit L5 consists of a positive lens having a convex surface facing the entrance side, or a positive cemented lens composed of a negative meniscus lens having a convex surface facing the entrance side and a positive lens having a refractive power on the entrance side which is stronger than that of an opposite surface thereof.

(A-2) The cemented lens of the third lens unit L3 is composed of, in order from the entrance side to the exit side, a negative lens having a refractive power on the entrance side which is stronger than that of an opposite surface thereof, and a positive lens having a refractive power on the exit side which is stronger than that of an opposite surface thereof.

(A-3) The following condition is satisfied:

$$0 < fe/f12e < 0.2 \quad (1)$$

where fe is the focal length of the entire eyepiece lens, and f12e is a composite focal length of the first lens unit L1 and the second lens unit L2.

(A-4) The following condition is satisfied:

$$0.9 < -f2e/f1e < 2 \quad (2)$$

where f1e is the focal length of the first lens unit L1, and f2e is the focal length of the second lens unit L2.

(A-5) The following condition is satisfied:

$$3.3 < f4e/fe < 7 \quad (3)$$

where f4e is the focal length of the fourth lens unit L4, and fe is the focal length of the entire eyepiece lens.

(A-6) The following condition is satisfied:

$$2 < f5e/fe < 4.7 \quad (4)$$

where f5e is the focal length of the fifth lens unit L5, and fe is the focal length of the entire eyepiece lens.

(A-7) The following condition is satisfied:

$$0.2 < |bfe/fe| < 0.62 \quad (5)$$

where bfe is the back focal distance of the entire eyepiece lens obtained when parallel rays are made to enter from the exit side, and fe is the focal length of the entire eyepiece lens.

(A-8) The following condition is satisfied:

$$0.5 < D23e/fe < 1 \quad (6)$$

where D23e is an air interval between the second lens unit L2 and the third lens unit L3, and fe is the focal length of the entire eyepiece lens.

(A-9) The following condition is satisfied:

$$0.3 < SF1 < 0.8 \quad (7)$$

where SF1 is a shape factor of the first lens unit L1, expressed by the following equation:

$$SF1 = (R1R + R1F)/(R1R - R1F)$$

where R1F is a radius of curvature of a lens surface on the entrance side of the first lens unit L1, and R1R is a radius of curvature of a lens surface on the exit side of the first lens unit L1.

(A-10) The following condition is satisfied:

$$-3.5 < SF2 < -1 \quad (8)$$

where SF2 is a shape factor of the second lens unit L2, expressed by the following equation:

$$SF2 = (R2R + R2F)/(R2R - R2F)$$

where R2F is a radius of curvature of a lens surface on the entrance side of the second lens unit L2, and R2R is a radius of curvature of a lens surface on the exit side of the second lens unit L2.

(A-11) The following condition is satisfied:

$$-2 < SF4 < -0.15 \quad (9)$$

where SF4 is a shape factor of the fourth lens unit L4, expressed by the following equation:

$$SF4 = (R4R + R4F)/(R4R - R4F)$$

where R4F is a radius of curvature of a lens surface on the entrance side of the fourth lens unit L4, and R4R is a radius of curvature of a lens surface on the exit side of the fourth lens unit L4.

(A-12) The following condition is satisfied:

$$-0.5 < fe/R3S < 0.5 \quad (10)$$

where R3S is a radius of curvature of a cementing surface of the third lens unit L3, and fe is the focal length of the entire eyepiece lens.

(A-13) The following condition is satisfied:

$$1.63 < N345p \quad (11)$$

where N345p is a mean value of refractive indices of materials of positive lenses included in the third lens unit L3, the fourth lens unit L4 and the fifth lens unit L5.

(A-14) A lens surface on the exit side of the fifth lens unit L5 is convex toward the exit side.

Next, the technical significance of each of the above-mentioned conditions is described.

The condition (1) is provided for setting limits to the ratio of the focal length fe of the entire eyepiece lens to the composite focal length f12e of the first lens unit L1 and the second lens unit L2. In such a range as to exceed the lower limit of the condition (1), as the composite focal length of the first lens unit L1 and the second lens unit L2 becomes minus, an off-axial ray of light exiting from the second lens unit L2 diverges too largely, so that, as a result, the lens effective diameter of the third lens unit L3 through the fifth lens unit L5 disadvantageously becomes too large. In such a range as to exceed the upper limit of the condition (1), as the composite focal length of the first lens unit L1 and the second lens unit L2 becomes a small plus value, an off-axial ray of light exiting from the second lens unit L2 comes to converge, so that, as a result, it disadvantageously becomes impossible to secure the long eye relief.

In addition, more preferably, the condition (1) may be altered as follows:

$$0 < fe/f12e < 0.1 \quad (1a).$$

The condition (2) is provided for setting limits to the ratio of the focal length f2e of the second lens unit L2 to the focal length f1e of the first lens unit L1 in the eyepiece lens. In such a range as to exceed the lower limit of the condition (2), the focal length of the second lens unit L2 becomes too short, so that, as a result, an off-axial ray of light exiting from the second lens unit L2 comes to converge, thereby making the eye relief short. In such a range as to exceed the upper limit of the condition (2), the focal length of the second lens unit L2 becomes too long, so that, as a result, an off-axial ray of light exiting from the second lens unit L2 diverges too greatly, thereby disadvantageously making the lens effective diameter of the third lens unit L3 through the fifth lens unit L5 large.

In addition, more preferably, the condition (2) may be altered as follows:

$$1 < -f2e/f1e < 1.8 \quad (2a).$$

The condition (3) is provided for setting limits to the ratio of the focal length f4e of the fourth lens unit L4 to the focal length fe of the entire eyepiece lens. In such a range as to exceed the lower limit of the condition (3), the focal length of the fourth lens unit L4 becomes too short, so that, as a result, the thickness or effective diameter of the fourth lens unit L4 becomes large, thereby disadvantageously increasing the size of the whole eyepiece lens. In such a range as to exceed the upper limit of the condition (3), the focal length of the fourth lens unit L4 becomes too long, so that, as a result, a refractive power of each of the third lens unit L3 and the fifth lens unit L5 has to be strengthened, thereby disadvantageously increasing astigmatism and coma.

The condition (4) is provided for setting limits to the ratio of the focal length f5e of the fifth lens unit L5 to the focal length fe of the entire eyepiece lens. In such a range as to exceed the lower limit of the condition (4), the focal length of the fifth lens unit L5 becomes too short, thereby disadvantageously increasing astigmatism and coma. In such a range as to exceed the upper limit of the condition (4), the focal length of the fifth lens unit L5 becomes too long, so that, as a result, refractive powers concentrate on the third lens unit L3 and the fourth lens unit L4, thereby disadvantageously making the eye relief short.

The condition (5) is provided for setting limits to the ratio of the back focal distance bfe of the entire eyepiece lens obtained when parallel rays are made to enter from the observation side (exit side) to the focal length fe of the entire eyepiece lens. In such a range as to exceed the lower limit of the condition (5), the back focal distance becomes too short, so that, as a result, the intermediate image position MIP becomes too close to a lens surface on the exit side of the second lens unit L2, thereby disadvantageously making any dust or scratch on the lens surface conspicuous. In such a range as to exceed the upper limit of the condition (5), the back focal distance becomes too long, so that, as a result, the intermediate image position MIP becomes too close to a lens surface on the entrance side of the third lens unit L3, thereby disadvantageously making any dust or scratch on the lens surface conspicuous. Here, the position of a focus of the entire eyepiece lens is located on the exit side of a vertex of a lens surface on the entrance side of the first lens unit L1.

The condition (6) is provided for setting limits to the ratio of an air interval between the second lens unit L2 and the third lens unit L3 to the focal length of the entire eyepiece lens. In such a range as to exceed the lower limit of the condition (6), the air interval between the second lens unit L2 and the third lens unit L3 becomes too short, so that, as a result, the intermediate image position MIP becomes too close to a lens surface on the exit side of the second lens unit L2 or a lens surface on the entrance side of the third lens unit L3, thereby disadvantageously making any dust or scratch on the lens surface conspicuous. In such a range as to exceed the upper limit of the condition (6), the lens effective diameter of the third lens unit and subsequent lens units disadvantageously becomes too large.

The condition (7) is provided for setting limits to the shape of the first lens unit L1 of the eyepiece lens. In such a range as to exceed the lower limit of the condition (7), a refractive power of a lens surface on the entrance side of the first lens unit L1 becomes too weak, so that it is difficult to obtain a desired enlargement rate at the intermediate image position MIP. In such a range as to exceed the upper limit of the condition (7), a refractive power of a lens surface on the entrance side of the first lens unit L1 becomes too strong, so that spherical aberration increases disadvantageously.

The condition (8) is provided for setting limits to the shape of the second lens unit L2 of the eyepiece lens. In such a range as to exceed the lower limit of the condition (8), a negative refractive power of a lens surface on the entrance side of the second lens unit L2 becomes too strong, so that an off-axial ray of light exiting from the second lens unit L2 diverges too largely, thereby disadvantageously making the effective diameter of the third lens unit L3 and subsequent lens units large. In such a range as to exceed the upper limit of the condition (8), a negative refractive power of a lens surface on the entrance side of the second lens unit L2 becomes too weak, so that, as a result, an off-axial ray of light exiting from the second lens unit L2 comes to converge, thereby disadvantageously making the eye relief short.

The condition (9) is provided for setting limits to the shape of the fourth lens unit L4 of the eyepiece lens. In such a range as to exceed the lower limit of the condition (9), a refractive power of a lens surface on the exit side of the fourth lens unit L4 becomes too strong, so that astigmatism increases. In such a range as to exceed the upper limit of the condition (9), a refractive power of a lens surface on the entrance side of the fourth lens unit L4 becomes too strong, so that, as a result, the eye relief becomes short disadvantageously.

The condition (10) is provided for setting limits to the ratio of the focal length fe of the entire eyepiece lens to the radius of curvature R3S of a cementing surface of the third lens unit L3. In such a range as to exceed the lower limit of the condition (10), a refractive power of a negative lens included in the third lens unit L3 becomes too weak, so that, as a result, the eye relief becomes short. In such a range as to exceed the upper limit of the condition (10), a refractive power of the negative lens included in the third lens unit L3 becomes too strong, so that the effective diameter of the fourth lens unit L4 and subsequent lens unit becomes large disadvantageously.

The condition (11) is provided for setting a limit to a mean value of refractive indices of materials of positive lenses included in the third lens unit L3, the fourth lens unit L4 and the fifth lens unit L5 of the eyepiece lens. In such a range as to exceed the lower limit of the condition (11), curvature of field comes to appear in an under direction, and the radius of curvature of each lens surface becomes small, so that the lens thickness of each of the positive lenses becomes large, thereby disadvantageously increasing the total lens length and the effective diameter.

In addition, more preferably, the condition (11) may be altered as follows:

$$1.65 < N345p \tag{11a}$$

Next, the characteristic features of each of the eyepiece lenses according to the numerical examples 1 to 6 corresponding to the first embodiment will be described.

The eyepiece lens according to the numerical example 1 shown in FIG. 1 is constructed with, in order from the entrance side for light to the exit side for light, a first lens unit L1 consisting of one negative lens having a concave surface facing the entrance side, which is stronger in negative refractive power than a concave surface thereof facing the exit side, a second lens unit L2 consisting of one positive meniscus lens having a convex surface facing the exit side (observation side), being followed by an intermediate image position MIP, a third lens unit L3 consisting of a cemented lens of positive refractive power as a whole composed of a negative lens L3n having a concave surface facing the entrance side which is stronger in refractive power than a surface thereof facing the exit side and a positive lens L3p having a convex surface facing the exit side which is stronger in refractive power than a surface thereof facing the entrance side, a fourth lens unit L4 consisting of one positive lens having a convex surface facing the exit side which is stronger in refractive power than a surface thereof facing the entrance side, and a fifth lens unit L5 consisting of a positive cemented lens composed of a negative meniscus lens L5n having a convex surface facing the entrance side and a positive lens L5p having a refractive power on the entrance side which is stronger than that of a surface thereof facing the exit side.

Between the entrance side and the intermediate image position MIP, there are disposed a negative lens and a positive lens in order from the entrance side. Accordingly, when the eyepiece lens is used for an observing optical system, an aerial image formed by an objective lens (not shown) is enlarged at the intermediate image position MIP.

Further, the eye relief is set large by raising an off-axial ray greatly from the optical axis. In order to obtain a large enlargement rate in a small space with the first lens unit L1 and the second lens unit L2, a negative refractive power on the entrance side of the first lens unit L1 is strengthened and a positive refractive power on the exit side of the second lens unit L2 is strengthened.

In order to lessen the occurrence of lateral chromatic aberration up to the intermediate image position MIP, an Abbe number of material (glass) of the first lens unit L1 is set large and an Abbe number of material (glass) of the second lens unit is set small.

If lateral chromatic aberration occurs largely up to the intermediate image position MIP, it is necessary to correct the occurring lateral chromatic aberration at the exit side of the intermediate image position MIP, so that a field ring disposed at the intermediate image position MIP would color disadvantageously.

Further, in the third, fourth and fifth lens units, which are located on the observation side of the intermediate image position MIP, since an off-axial ray passes through only a marginal portion of each lens, the occurrence of astigmatism is large. In order to cause reverse aberration for correcting such astigmatism to occur, the first lens unit L1 and the second lens unit L2 are disposed on the entrance side of the intermediate image position MIP.

Lenses are disposed both on the entrance side and the exit side across the intermediate image position MIP. Then, aberration correction is effected well by causing opposite aberrations to occur across the intermediate image position MIP in such a manner that a ray of light located above an off-axial principal ray on the entrance side for light becomes a ray of light located below the off-axial principal ray on the exit side for light, and a ray of light located below the off-axial principal ray on the entrance side for light becomes a ray of light located above the off-axial principal ray on the exit side for light.

In order to correct longitudinal chromatic aberration and lateral chromatic aberration and to secure the long eye relief by raising an off-axis ray of light, the third lens unit L3 is constructed with a positive meniscus cemented lens composed of, in order from the entrance side to the exit side, a negative lens L3n having a concave surface facing the entrance side which is stronger in refractive power than a surface thereof facing the exit side, and made of a material whose Abbe number is small, and a positive lens L3p having a convex surface facing the exit side which is stronger in refractive power than a surface thereof facing the entrance side, and made of a material whose Abbe number is large.

In order to secure the long eye relief, the fourth lens unit L4 is constructed with one positive lens having a convex surface facing the exit side which is stronger in refractive power than a surface thereof facing the entrance side.

In order to correct longitudinal chromatic aberration and lateral chromatic aberration and to lessen the occurrence of lateral chromatic aberration of higher orders due to the correction of lateral chromatic aberration, the fifth lens unit L5 is constructed with a positive cemented lens composed of, in order from the entrance side to the exit side, a negative meniscus lens L5n having a convex surface facing the entrance side and made of a material whose Abbe number is small, and a positive lens L5p having a refractive power on the entrance side which is stronger than that of a surface thereof facing the exit side and made of a material whose Abbe number is large. If the order of arrangement of the negative lens L5n and the positive lens L5p in the fifth lens unit L5 is reversed, an angle of incidence of an off-axial principal ray on a cementing surface of the cemented lens becomes large, thereby disadvantageously causing lateral chromatic aberration of higher order to occur.

FIGS. 2A to 2D are aberration diagrams showing the various aberrations occurring in the eyepiece lens according to the numerical example 1. As shown in FIGS. 2A to 2D, every aberration is corrected extremely well. In particular, curvature of field is suppressed below ±1 Dptr both with respect to a sagittal plane and a meridional plane up to the marginal portion of a field of view. Accordingly, it is possible to observe an extremely clear object image up to the marginal portion of a field of view.

Figure 3:
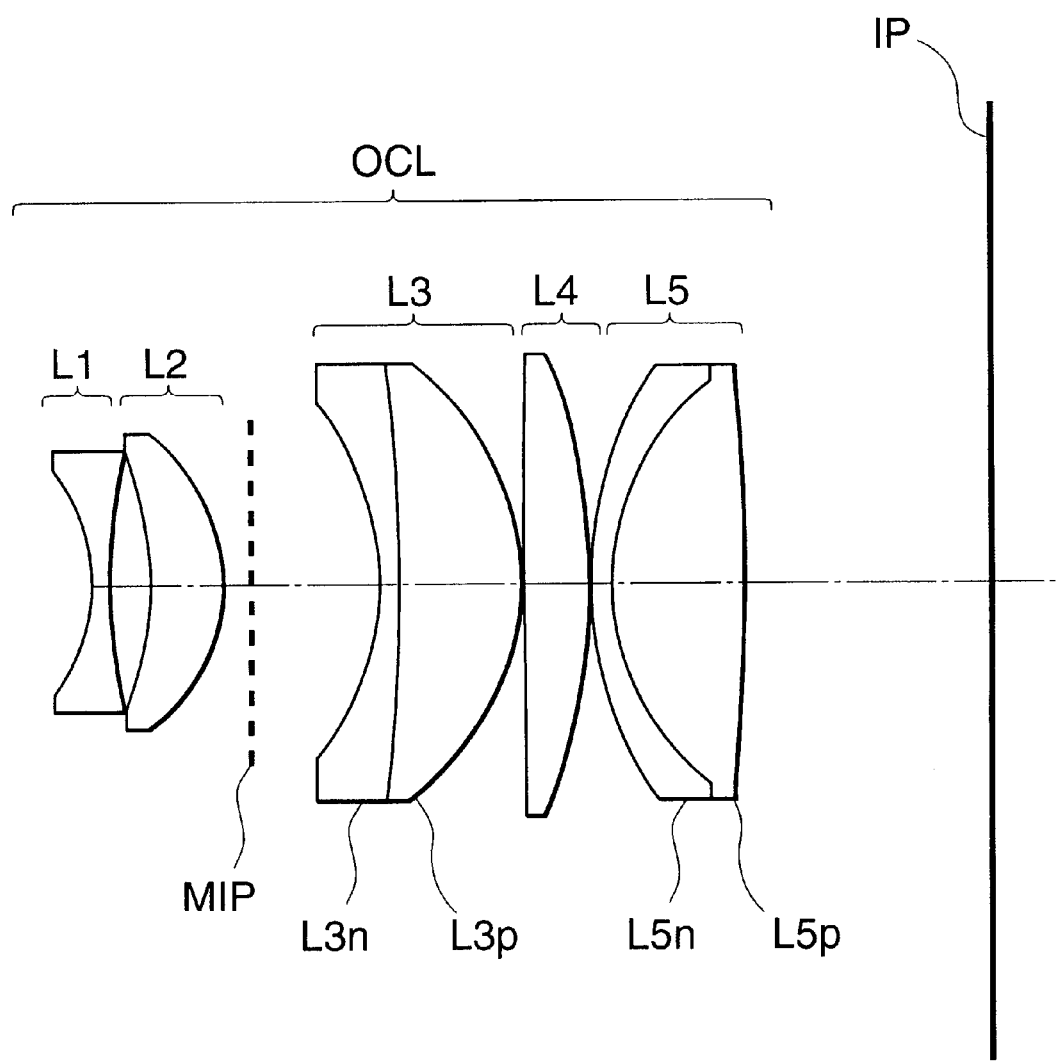
FIG. 3 is a lens sectional view showing an eyepiece lens according to a numerical example 2 of the invention.
Figure 4:
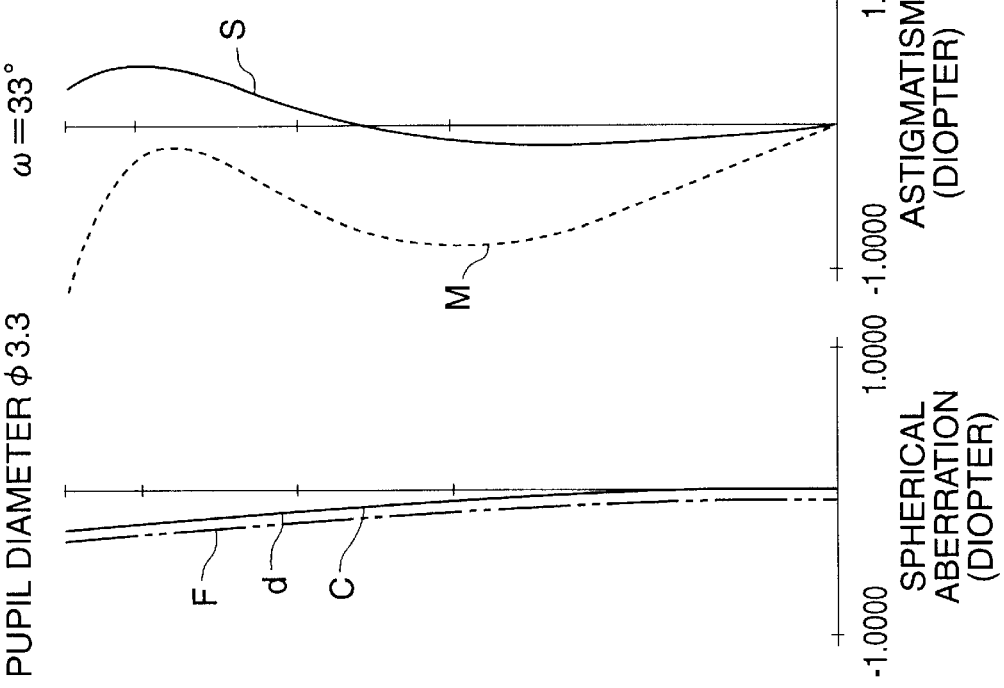
FIGS. 4A to 4D are aberration diagrams showing the various aberrations, in an afocal system, occurring in the eyepiece lens according to the numerical example 2.

The eyepiece lens according to the numerical example 2 shown in FIG. 3 has the same construction as that of the eyepiece lens according to the numerical example 1, except for a difference in the material of the negative lens L5n of the fifth lens unit L5.

FIGS. 4A to 4D are aberration diagrams showing the various aberrations occurring in the eyepiece lens according to the numerical example 2. As shown in FIGS. 4A to 4D, every aberration is corrected extremely well.

Figure 5:
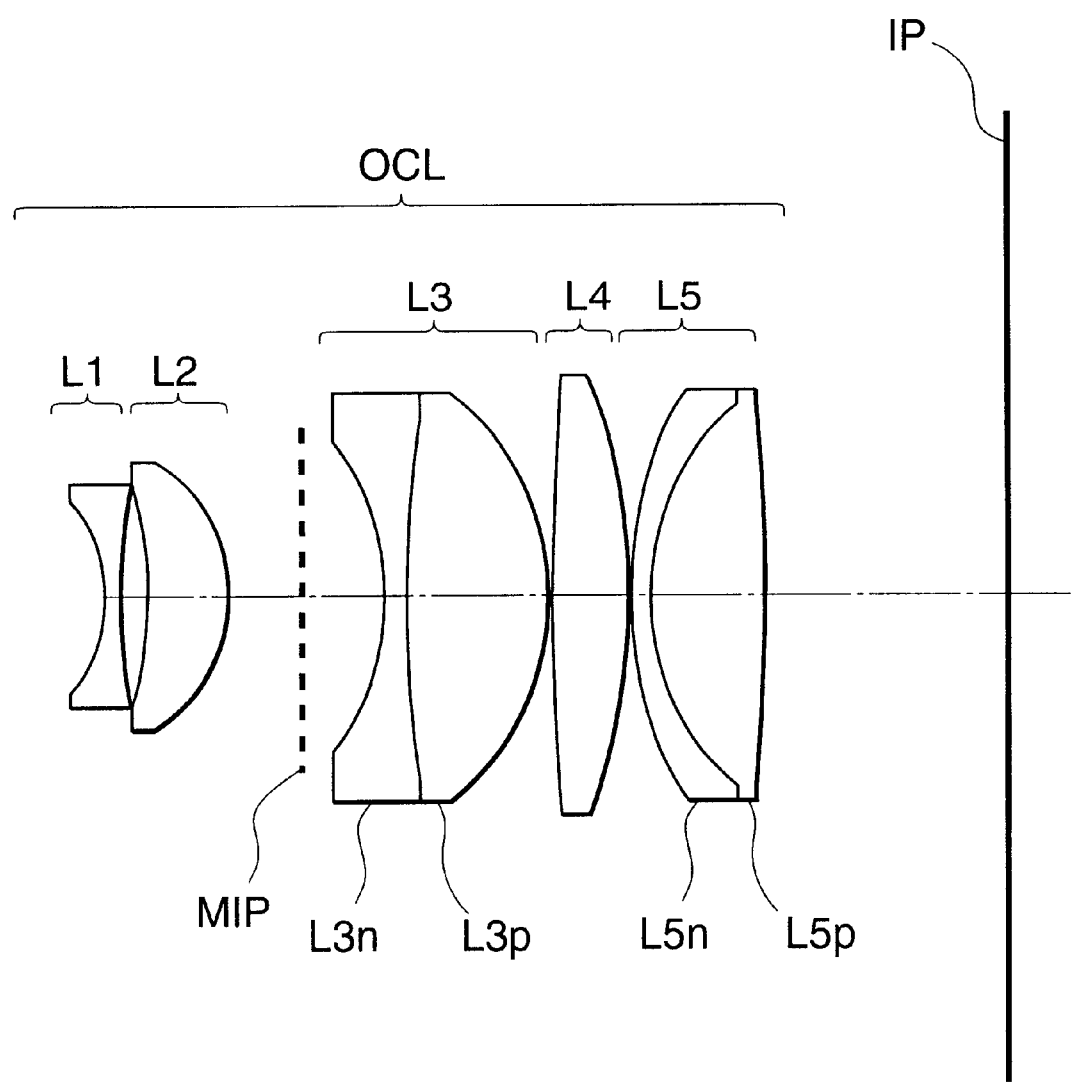
FIG. 5 is a lens sectional view showing an eyepiece lens according to a numerical example 3 of the invention.
Figure 6:
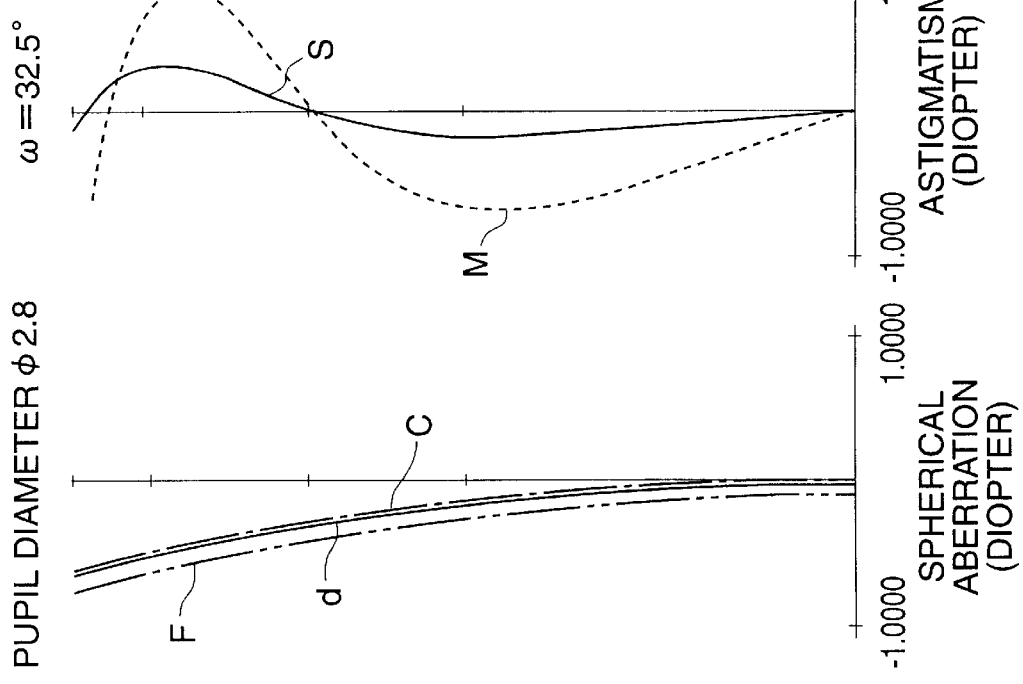
FIGS. 6A to 6D are aberration diagrams showing the various aberrations, in an afocal system, occurring in the eyepiece lens according to the numerical example 3.

The eyepiece lens according to the numerical example 3 shown in FIG. 5 is an example in which the enlargement rate obtained up to the intermediate image position MIP is enlarged and the focal length of the entire eyepiece lens is shortened, as compared with the eyepiece lenses according to the numerical examples 1 and 2.

FIGS. 6A to 6D are aberration diagrams showing the various aberrations occurring in the eyepiece lens according to the numerical example 3. As shown in FIGS. 6A to 6D, every aberration is corrected extremely well.

Figure 7:
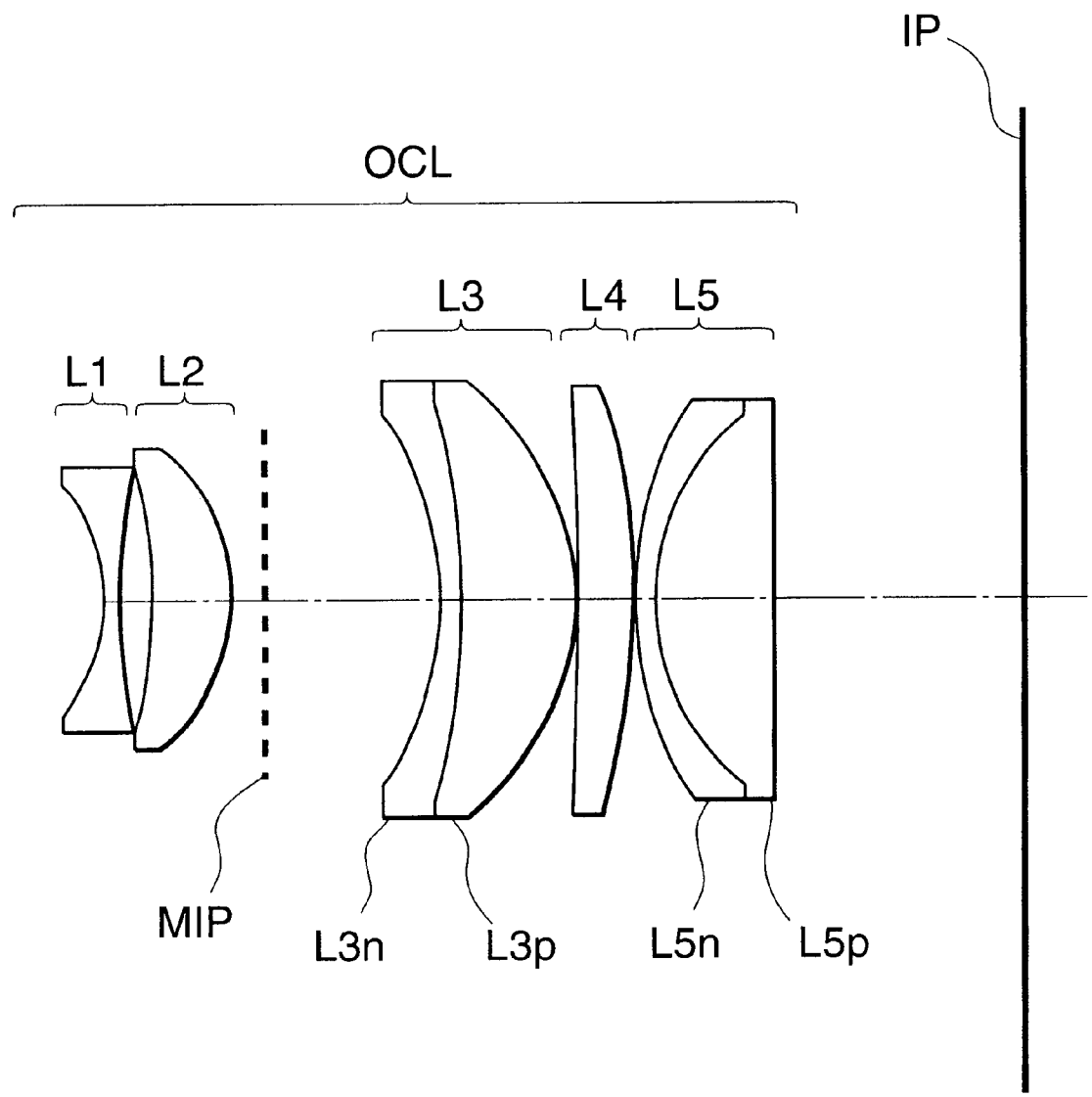
FIG. 7 is a lens sectional view showing an eyepiece lens according to a numerical example 4 of the invention.
Figures 8A, 8B, 8C, 8D:
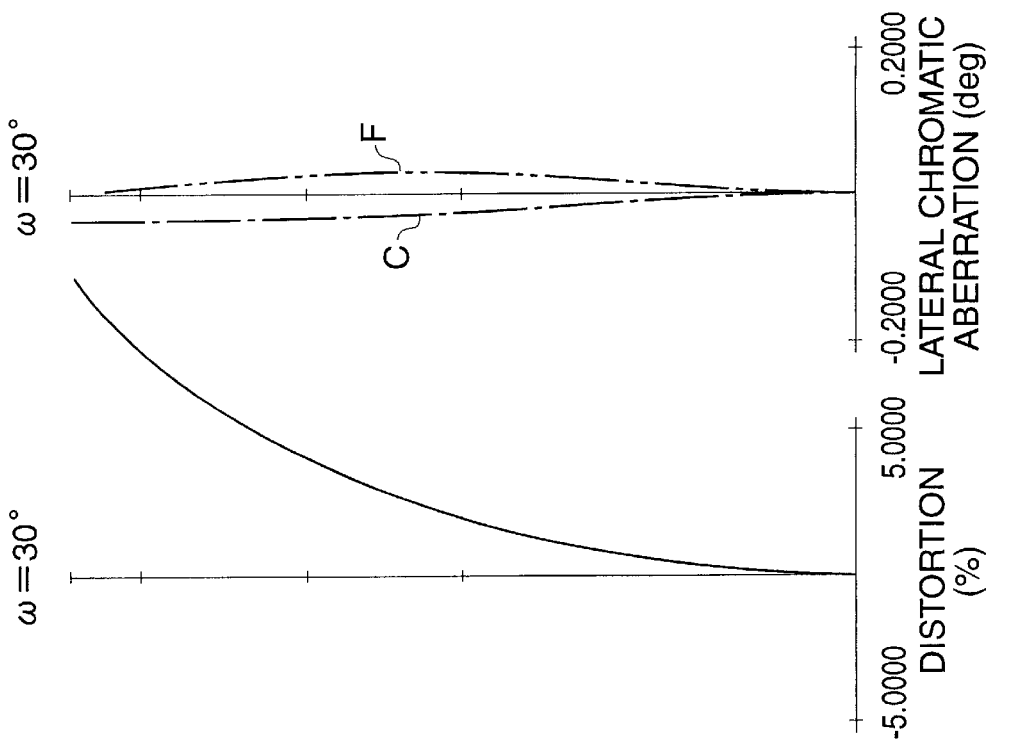
FIGS. 8A to 8D are aberration diagrams showing the various aberrations, in an afocal system, occurring in the eyepiece lens according to the numerical example 4.
Figure 9:
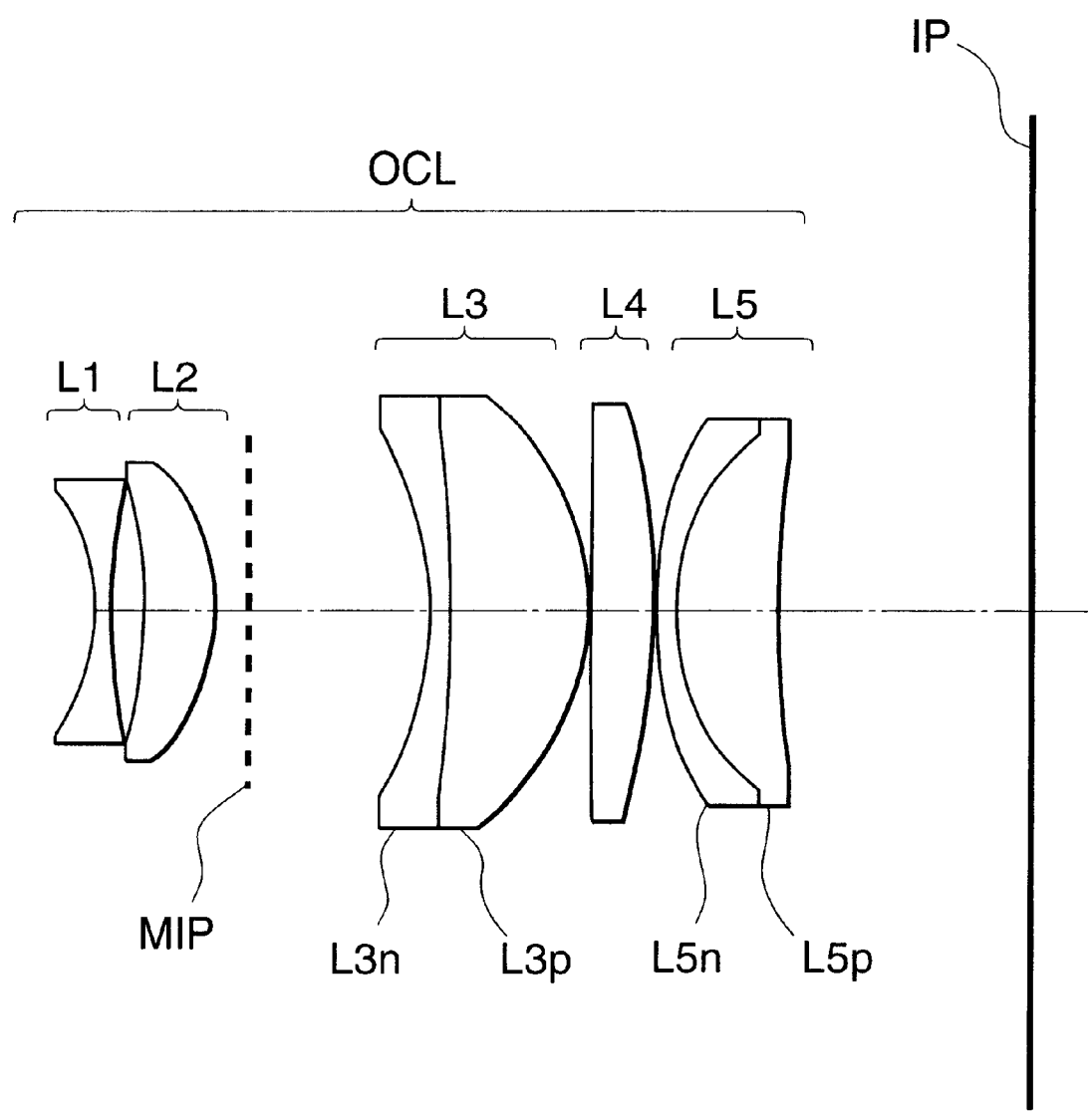
FIG. 9 is a lens sectional view showing an eyepiece lens according to a numerical example 5 of the invention.
Figure 10:
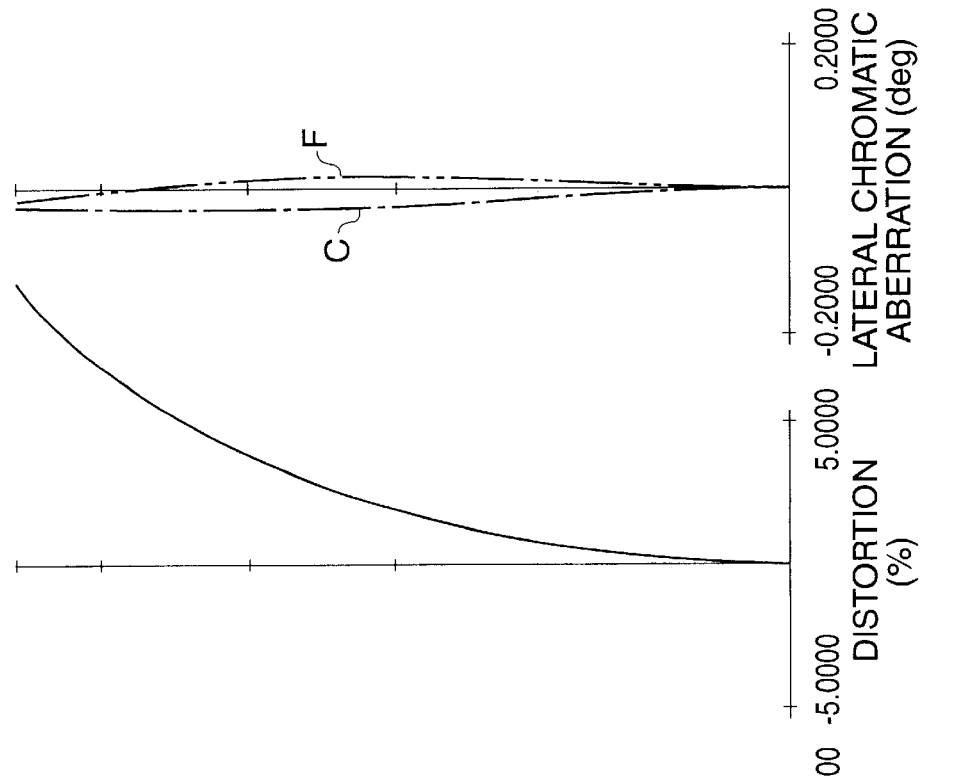
FIGS. 10A to 10D are aberration diagrams showing the various aberrations, in an afocal system, occurring in the eyepiece lens according to the numerical example 5.

The eyepiece lenses according to the numerical examples 4 and 5 shown in FIGS. 7 and 9 are examples in which the enlargement rate obtained up to the intermediate image position MIP is lessened and the focal length of the entire eyepiece lens is lengthened, as compared with the eyepiece lenses according to the numerical examples 1 and 2.

FIGS. 8A to 8D and FIGS. 10A to 10D are aberration diagrams showing the various aberrations occurring in the eyepiece lenses according to the numerical examples 4 and 5. As shown in FIGS. 8A to 8D and FIGS. 10A to 10D, every aberration is corrected extremely well.

Figure 11:
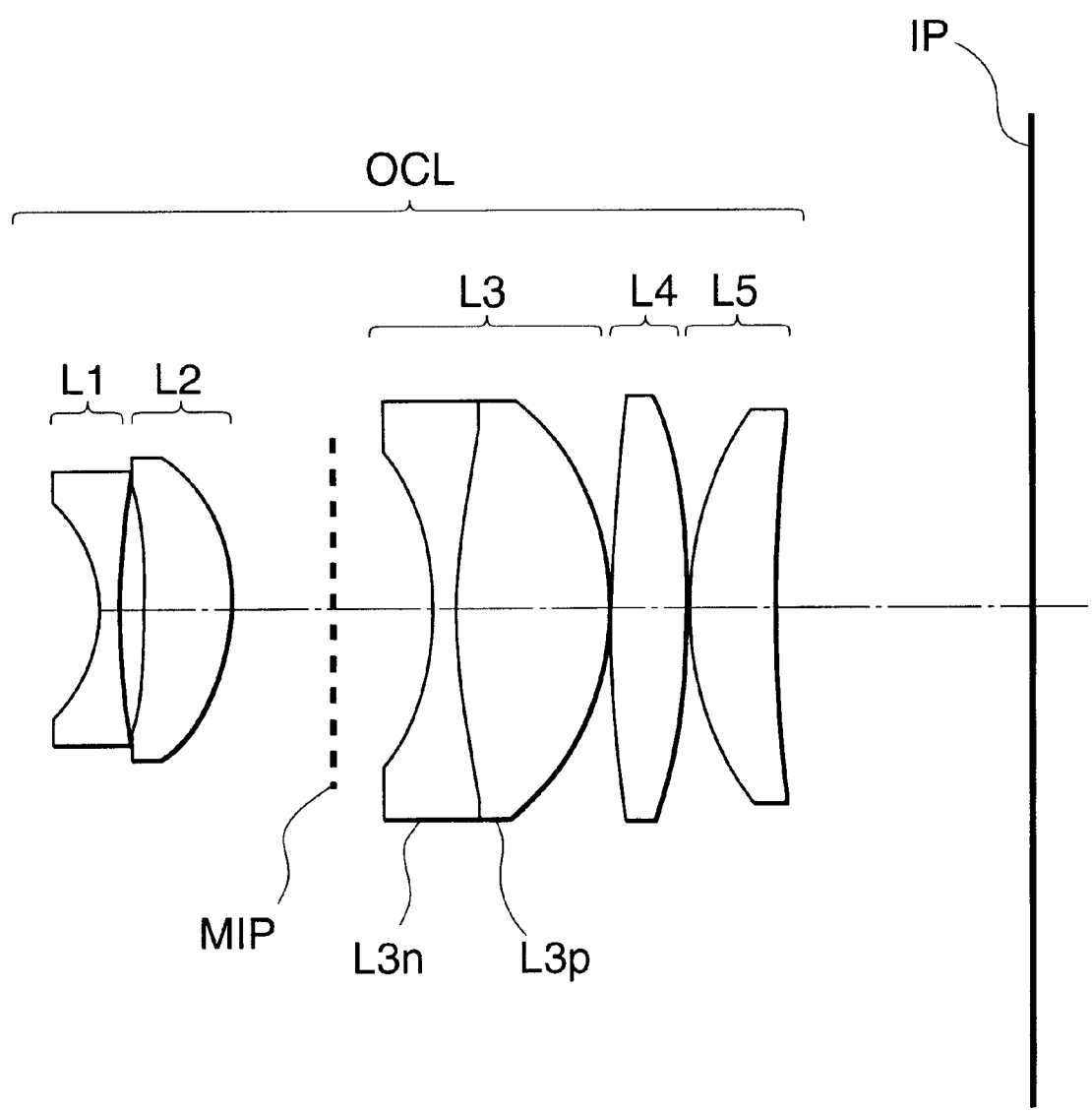
FIG. 11 is a lens sectional view showing an eyepiece lens according to a numerical example 6 of the invention.
Figure 12:
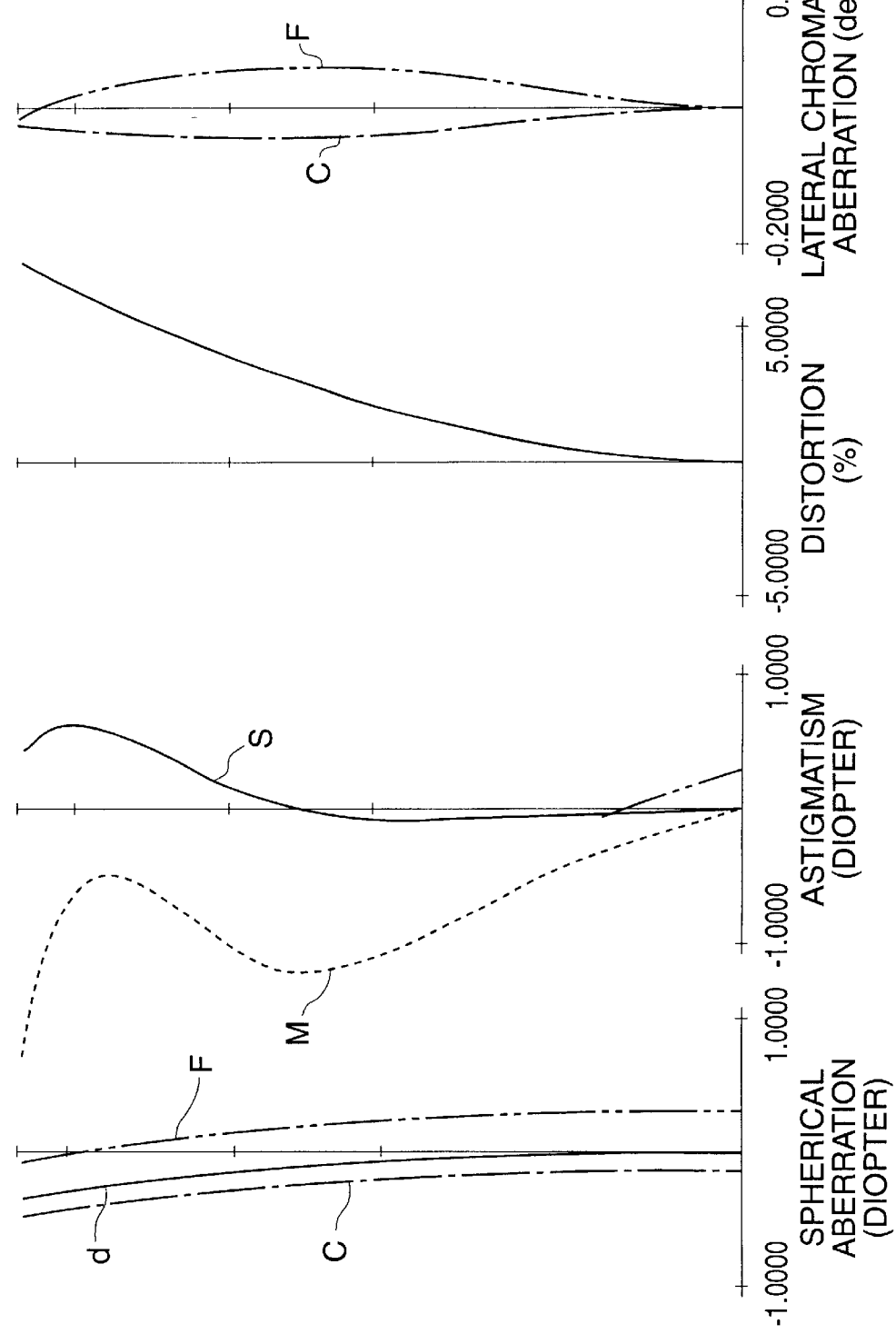
FIGS. 12A to 12D are aberration diagrams showing the various aberrations, in an afocal system, occurring in the eyepiece lens according to the numerical example 6.

The eyepiece lens according to the numerical example 6 shown in FIG. 11 is an example in which the reduction in number of lens elements is realized by having the fifth lens unit L5 consisting of one positive lens.

FIGS. 12A to 12D are aberration diagrams showing the various aberrations occurring in the eyepiece lens according to the numerical example 6. As shown in FIGS. 12A to 12D, although longitudinal chromatic aberration and lateral chromatic aberration increase somewhat as compared with the eyepiece lenses according to the numerical examples 1 to 5, the other aberrations are corrected well.

In addition, in the eyepiece lenses according to the numerical examples 1 to 3, the fifth lens unit L5 is of the shape convex toward the exit side so as to lengthen the eye relief and to lessen the effective diameter of each of the third, fourth and fifth lens units.

(Second Embodiment)

Figure 13:
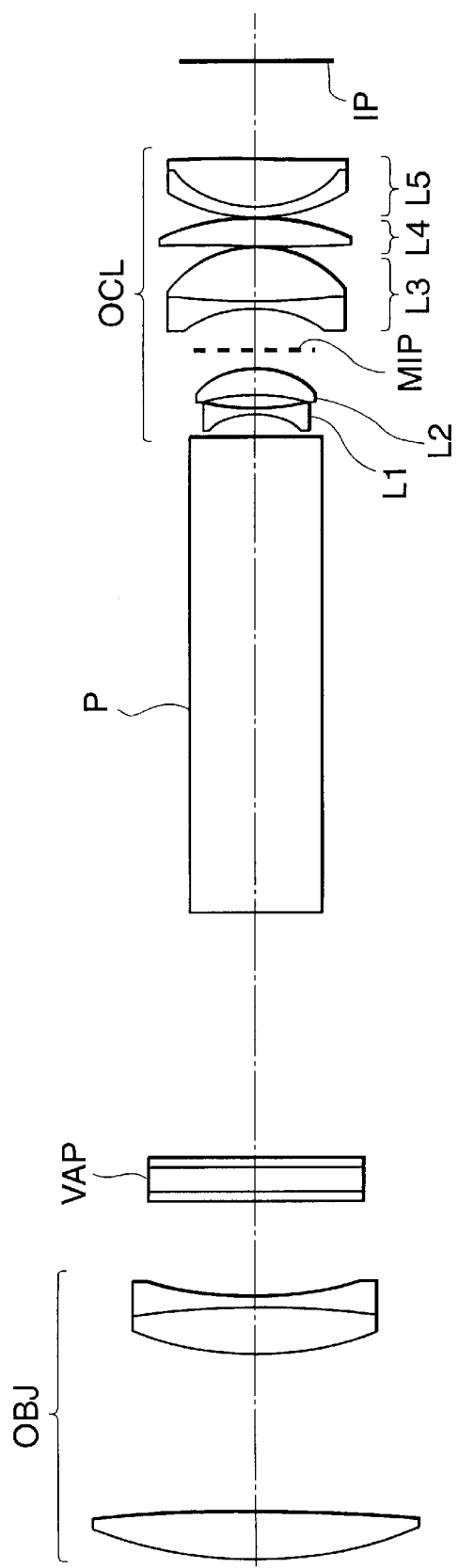
FIG. 13 is a lens sectional view showing a telescope according to a numerical example 7 of the invention.
Figure 14:
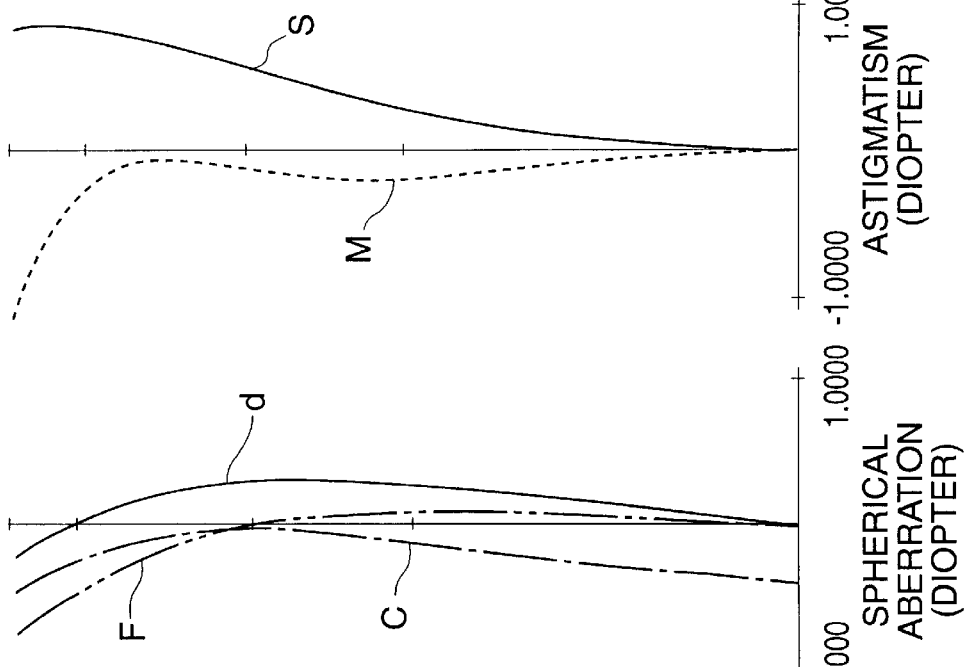
FIGS. 14A to 14D are aberration diagrams showing the various aberrations, in an afocal system, occurring in the telescope according to the numerical example 7.
Figure 15:
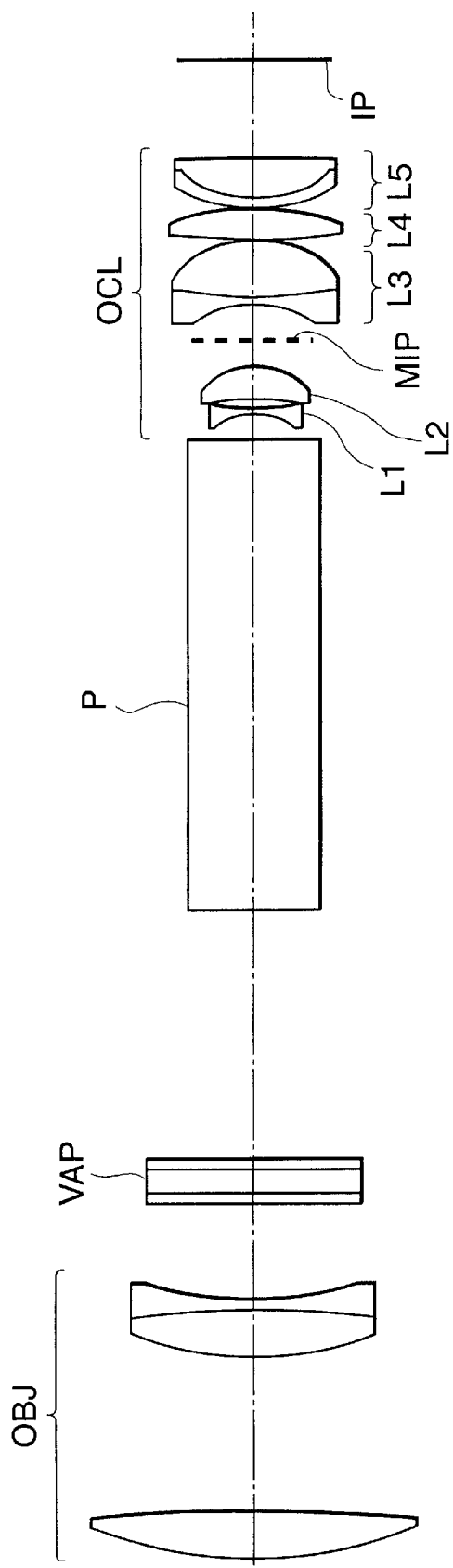
FIG. 15 is a lens sectional view showing a telescope according to a numerical example 8 of the invention.
Figure 16:
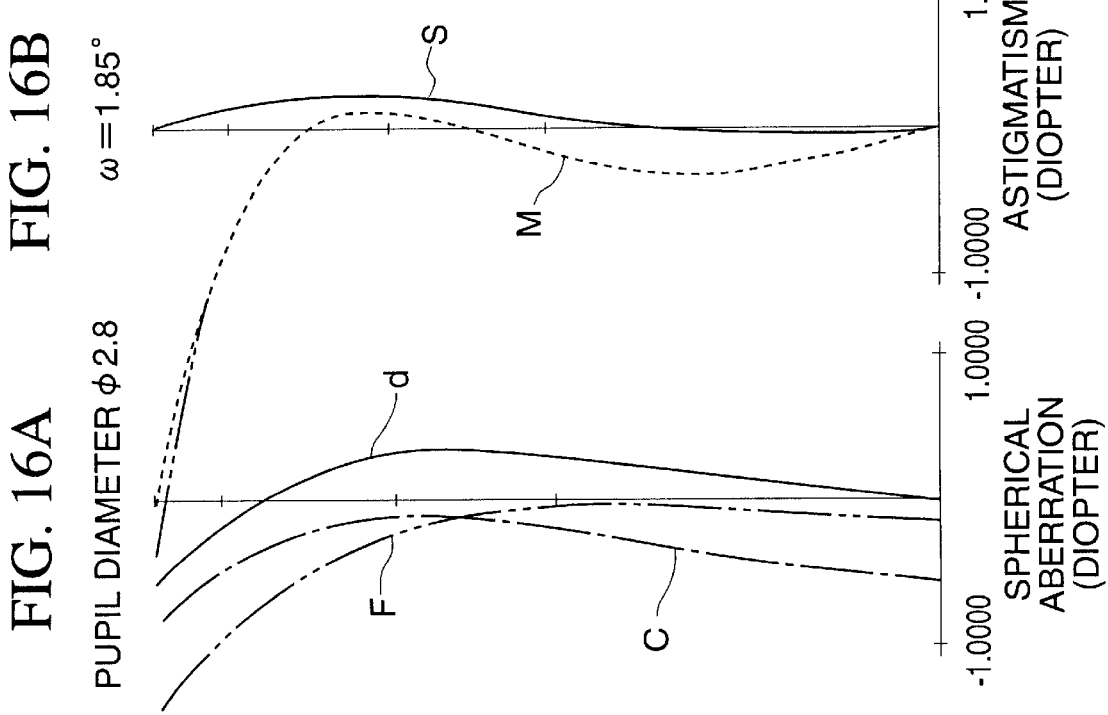
FIGS. 16A to 16D are aberration diagrams showing the various aberrations, in an afocal system, occurring in the telescope according to the numerical example 8.

Next, a telescope according to a second embodiment of the invention is described below. FIGS. 13 and 15 are lens sectional views respectively showing telescopes set forth in numerical examples 7 and 8 (to be described later) corresponding to the second embodiment.

As shown in each of the lens sectional views of FIGS. 13 and 15, the telescope according to the second embodiment includes at least, in order from the entrance side for light to the exit side for light, an objective lens OBJ of positive refractive power, an erecting prism P for inverting an image formed by the objective lens OBJ, and an eyepiece lens OCL. As the erecting prism P, a Porro-II-type prism, which is constructed by cementing together three right-angle prisms, or the like is suitably used.

In addition, in each of the telescopes according to the numerical examples 7 and 8 shown in FIGS. 13 and 15, a deflecting means VAP, which is composed of a variable angle prism, is also included between the objective lens OBJ and the erecting prism P. The variable angle prism VAP is arranged to correct the shaking of an object image due to the vibration of the telescope, by varying the prism apex angle on the basis of vibration information obtained by a vibration detecting sensor (not shown).

Further, in the telescope according to the numerical example 7 shown in FIG. 13, the eyepiece lens according to the numerical example 1 mentioned in the foregoing is adopted as the eyepiece lens OCL. In the telescope according to the numerical example 8 shown in FIG. 15, the eyepiece lens according to the numerical example 3 mentioned in the foregoing is adopted as the eyepiece lens OCL. In addition, in each of the telescopes according to the numerical examples 7 and 8, an objective lens according to a numerical example 9 to be described later herein is adopted as the objective lens OBJ.

Further, in each of the telescopes according to the numerical examples 7 and 8, it is preferable to satisfy the following condition:

$$1.6 < Nep \quad (12)$$

where Nep is a refractive index of material of the erecting prism P.

In such a range as to exceed the lower limit of the condition (12), a length obtained by reducing the erecting prism P in terms of air becomes long, so that, as a result, it is necessary to enlarge the effective diameter of an entrance surface of the erecting prism P, thereby disadvantageously increasing the size of the erecting prism P.

In addition, more preferably, the condition (12) may be altered as follows:

$$1.63 < Nep \quad (12a).$$

Although will be described later in detail, the objective lens OBJ is constructed with, in order from the object side (entrance side) to the observation side (exit side), one positive lens having a convex surface facing the object side which is stronger in refractive power than a surface thereof facing the observation side, and a negative meniscus cemented lens convex toward the object side composed of, in order from the object side to the observation side, a positive lens of bi-convex form and a negative lens of bi-concave form. Accordingly, the objective lens OBJ is of the telephoto-type construction as a whole. By this arrangement, in spite of such a bright lens system as to have an F-number of F 3.6, it is possible to suppress the occurrence of spherical aberration of higher orders.

The erecting prism P is a member arranged to form an erecting image by inverting, in right and left directions and in upward and downward directions, an aerial image formed by the objective lens OBJ, and is illustrated, in FIGS. 13 and 15, as a glass block in which an optical path is expanded.

The eyepiece lens OCL is disposed on the observation side (exit side) of the erecting prism P, and is arranged such that an aerial image MIP formed by the objective lens OBJ, the variable angle prism VAP, the erecting prism P, and the first lens unit L1 and the second lens unit L2 of the eyepiece lens OCL is enlarged for observation by the third lens unit L3, the fourth lens unit L4 and the fifth lens unit L5 of the eyepiece lens OCL.

FIGS. 14A to 14D are aberration diagrams showing the various aberrations occurring in the telescope according to the numerical example 7. Although the telescope has such a high magnification as 15×, as shown in FIGS. 14A to 14D, every aberration is corrected extremely well. In particular, curvature of field is small, so that an extremely clear image having almost no blurring up to the marginal portion of a field of view can be obtained.

Further, FIGS. 16A to 16D are aberration diagrams showing the various aberrations occurring in the telescope according to the numerical example 8. Although the telescope has such a higher magnification as 18× than that of the telescope according to the numerical example 7, as shown in FIGS. 16A to 16D, every aberration is corrected extremely well.

(Third Embodiment)

Next, a binocular according to the third embodiment of the invention is described below with reference to FIG. 17.

Figure 17:
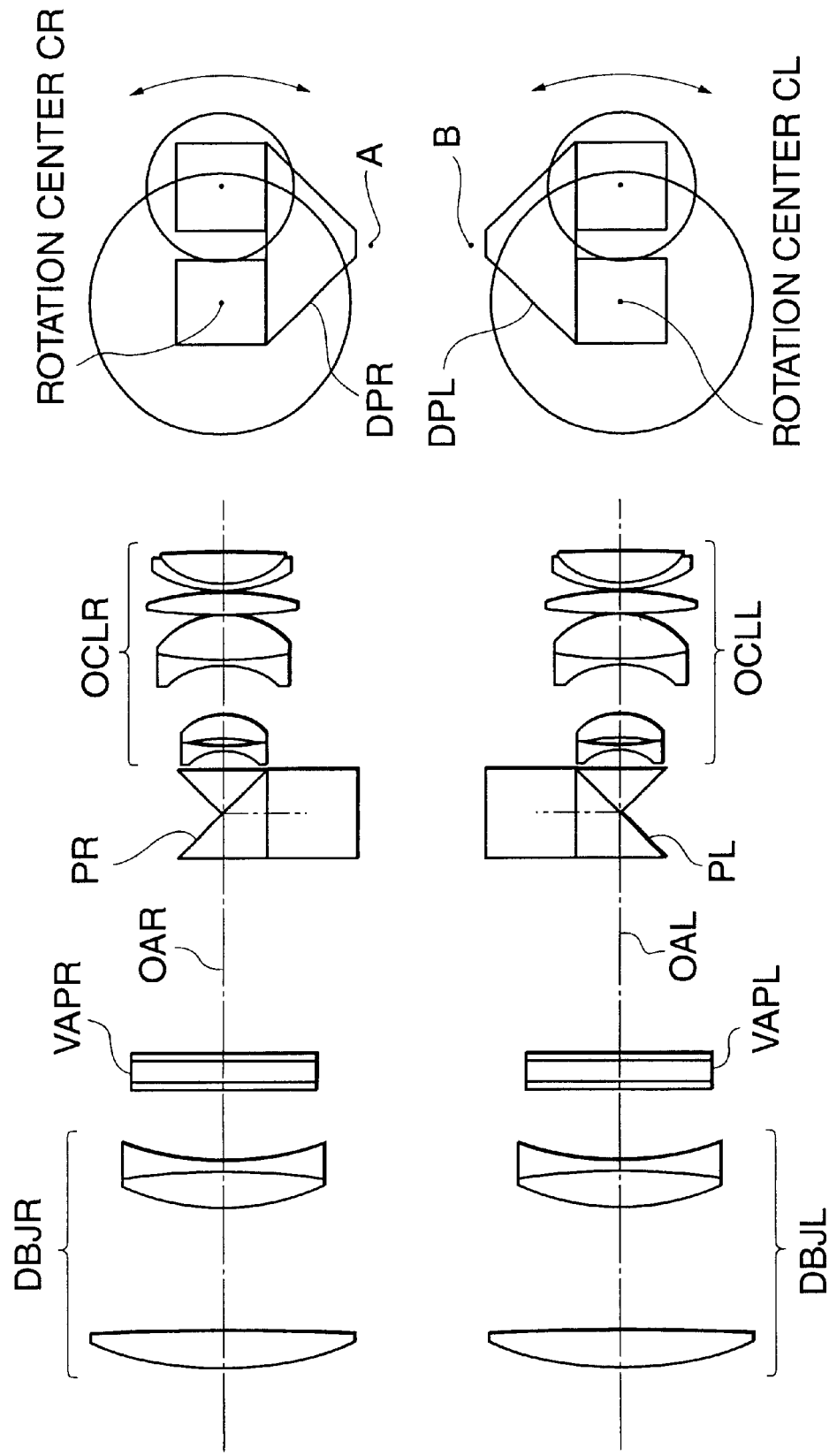
FIG. 17 is a diagram showing the construction of a binocular.

The binocular shown in FIG. 17 is composed of telescopes arranged in two rows for right and left eyes, each of which is the telescope according to the numerical example 8 shown in FIG. 15. Referring to FIG. 17, each of two erecting prisms PR and PL for right and left eyes is composed of a Porro-II-type prism formed by cementing together three right-angle prisms. Interpupillary adjustment is performed by rotating the two erecting prisms PR and PL for right and left eyes and the two eyepiece lenses OCLR and OCLL for right and left eyes respectively around the optical axes OAR and OAL (rotation centers CR and CL) of two objective lenses OBJR and OBJL for right and left eyes, which are normally fixed. With the optical axes OAR and OAL of the two objective lenses OBJR and OBJL for right and left eyes normally fixed, a movable interlocking mechanism (not shown) for two variable angle prisms VAPR and VAPL for right and left eyes for image stabilization can be constructed with ease.

Further, two apexes A and B of large right-angle prisms DPR and DPL of the two erecting prisms PR and PL for right and left eyes are disposed opposite to each other, so that the binocular is reduced in size as a whole with small projections of the erecting prisms PR and PL.

Further, the eyepiece lens included in the binocular according to the third embodiment is not limited to any one of the eyepiece lenses set forth in the first embodiment, and may have any lens construction as long as the eyepiece lens has a positive refractive power. In this instance, similarly to the telescope according to the second embodiment, it is preferable to satisfy the following condition:

$$1.6 < Nep \qquad (12)$$

where Nep is a refractive index of material of the erecting prism PR or PL.

In addition, more preferably, the condition (12) may be altered as follows:

$$1.63 < Nep \qquad (12a).$$

(Fourth Embodiment)

Next, an objective lens according to a fourth embodiment of the invention is described below.

Figure 18:
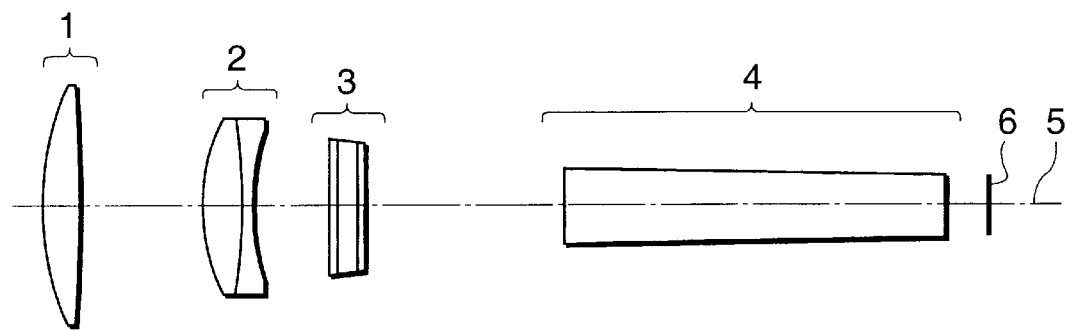
FIG. 18 is a lens sectional view showing an objective lens according to a numerical example 9 of the invention.
Figure 19:
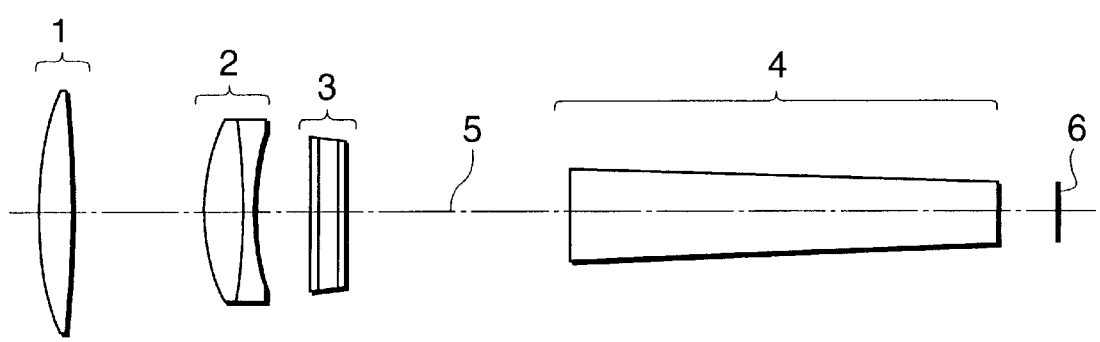
FIG. 19 is a lens sectional view showing an objective lens according to a numerical example 10 of the invention.
Figure 20:
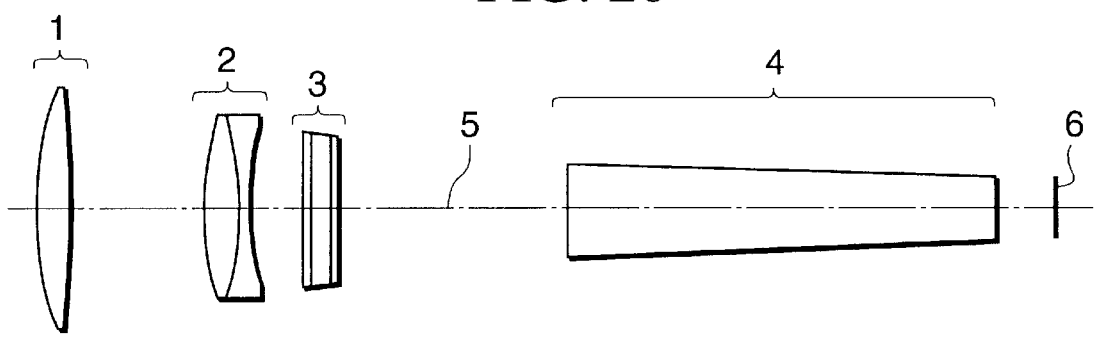
FIG. 20 is a lens sectional view showing an objective lens according to a numerical example 11 of the invention.
Figure 21:
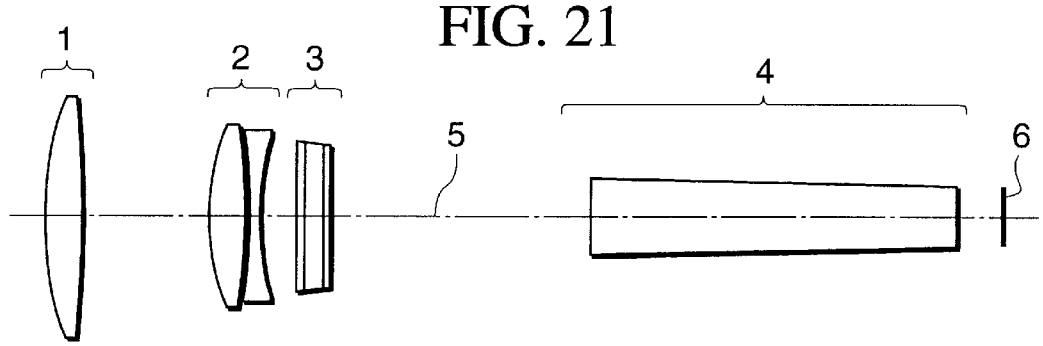
FIG. 21 is a lens sectional view showing an objective lens according to a numerical example 12 of the invention.
Figure 22:
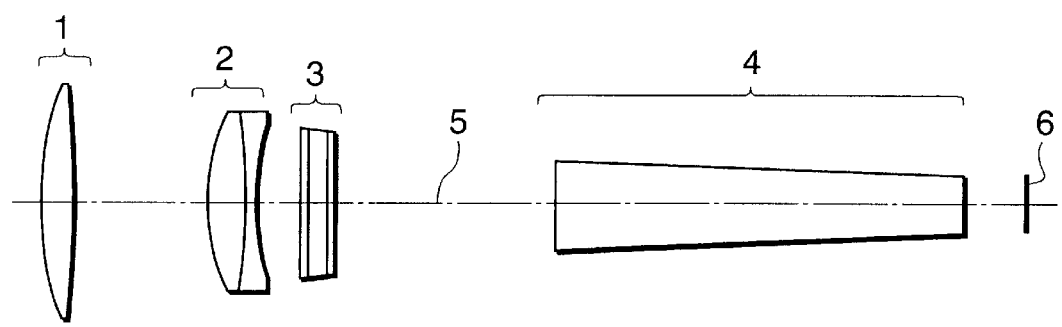
FIG. 22 is a lens sectional view showing an objective lens according to a numerical example 13 of the invention.
Figure 23:
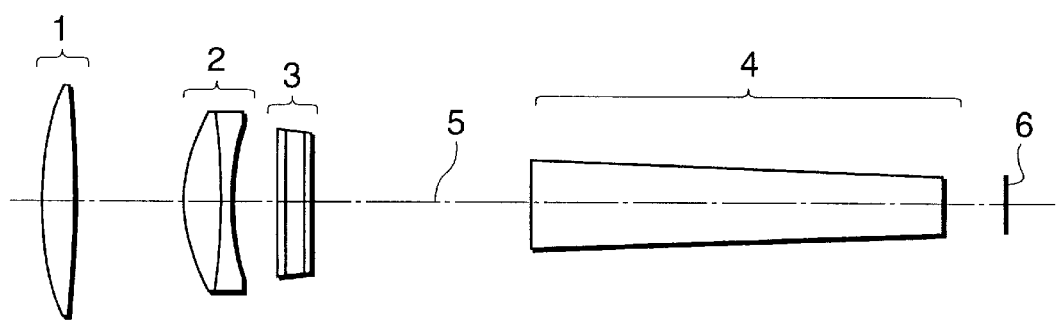
FIG. 23 is a lens sectional view showing an objective lens according to a numerical example 14 of the invention.

FIG. 18 is a lens sectional view showing an objective lens according to a numerical example 9 of the invention. FIG. 19 is a lens sectional view showing an objective lens according to a numerical example 10 of the invention. FIG. 20 is a lens sectional view showing an objective lens according to a numerical example 11 of the invention. FIG. 21 is a lens sectional view showing an objective lens according to a numerical example 12 of the invention. FIG. 22 is a lens sectional view showing an objective lens according to a numerical example 13 of the invention. FIG. 23 is a lens sectional view showing an objective lens according to a numerical example 14 of the invention.

Figures 24A, 24B, 24C:
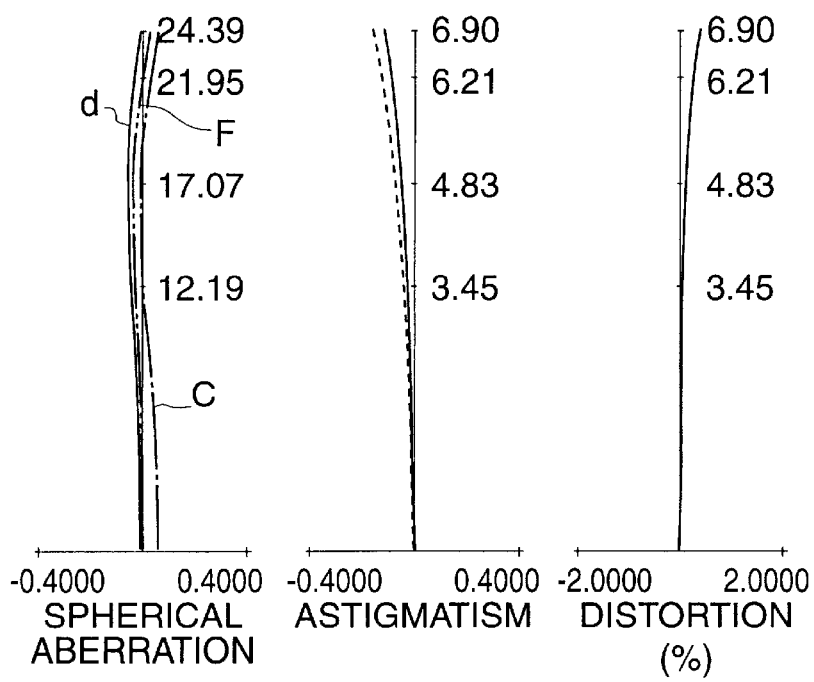
FIGS. 24A to 24C are aberration diagrams showing the various aberrations occurring in the objective lens according to the numerical example 9.
Figures 25A, 25B, 25C:
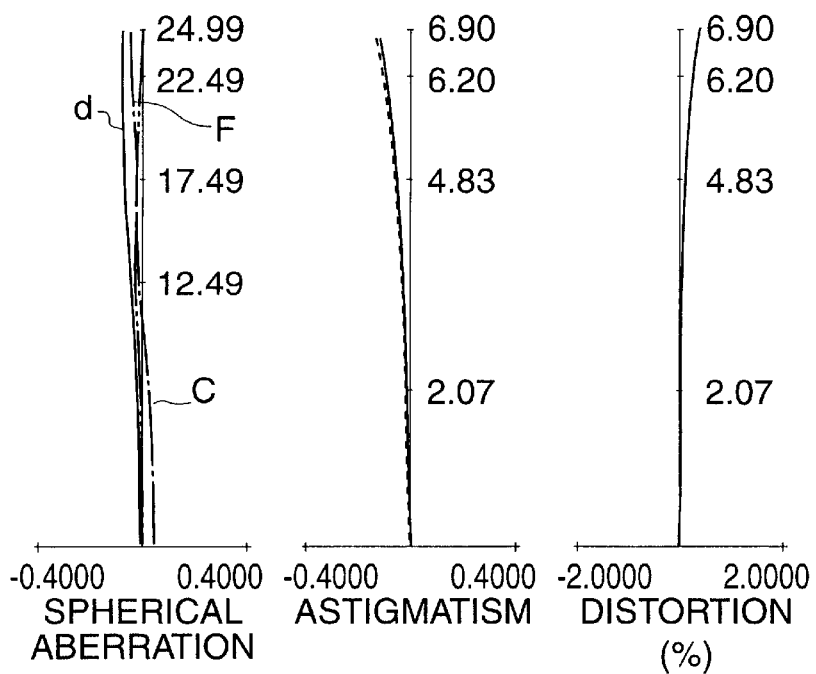
FIGS. 25A to 25C are aberration diagrams showing the various aberrations occurring in the objective lens according to the numerical example 10.
Figures 26A, 26B, 26C:
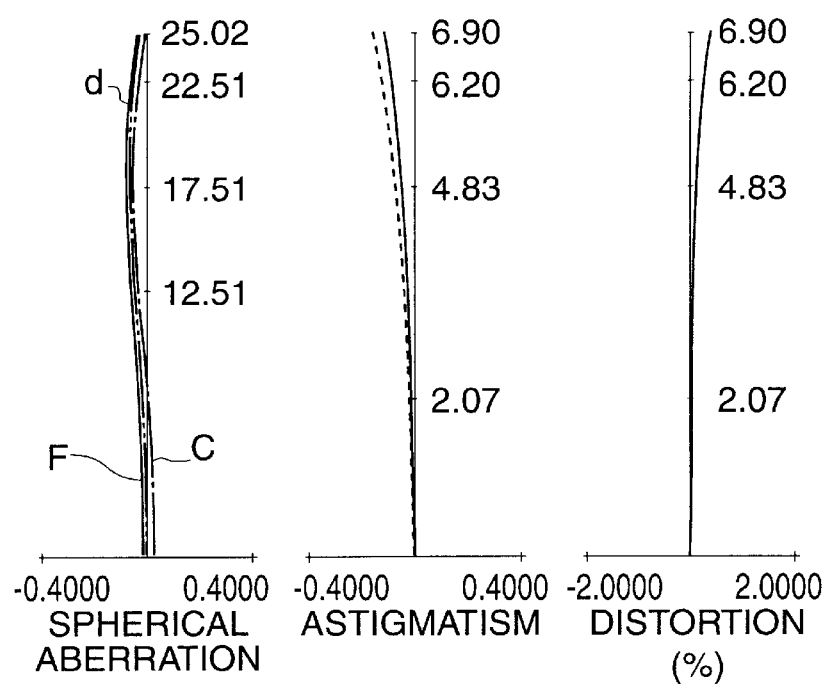
FIGS. 26A to 26C are aberration diagrams showing the various aberrations occurring in the objective lens according to the numerical example 11.
Figures 27A, 27B, 27C:
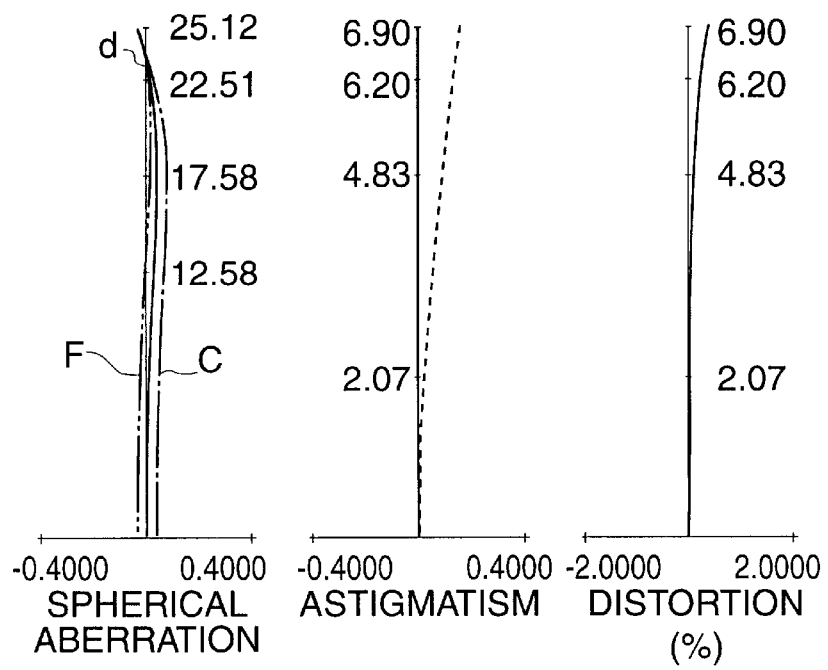
FIGS. 27A to 27C are aberration diagrams showing the various aberrations occurring in the objective lens according to the numerical example 12.
Figures 28A, 28B, 28C:
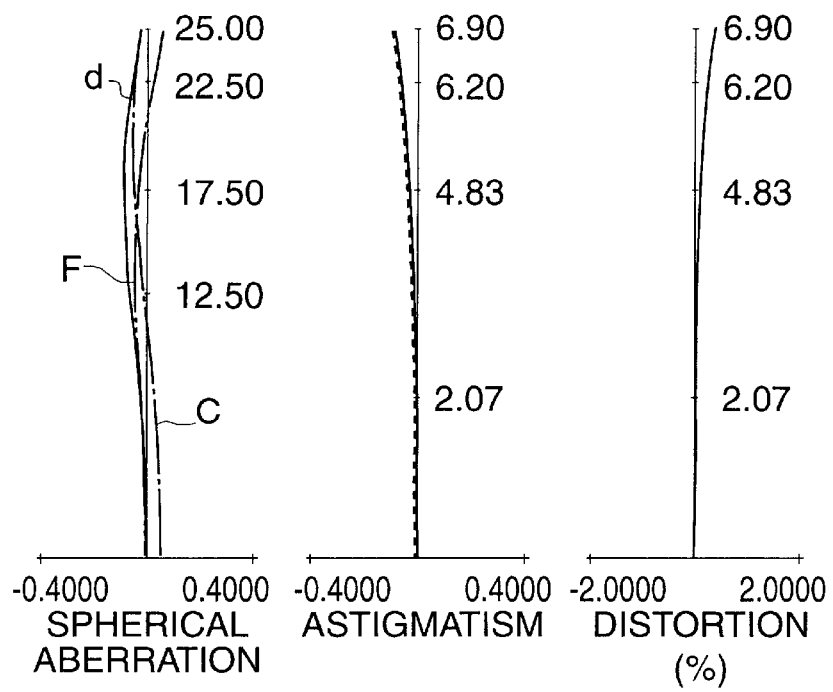
FIGS. 28A to 28C are aberration diagrams showing the various aberrations occurring in the objective lens according to the numerical example 13.
Figures 29A, 29B, 29C:
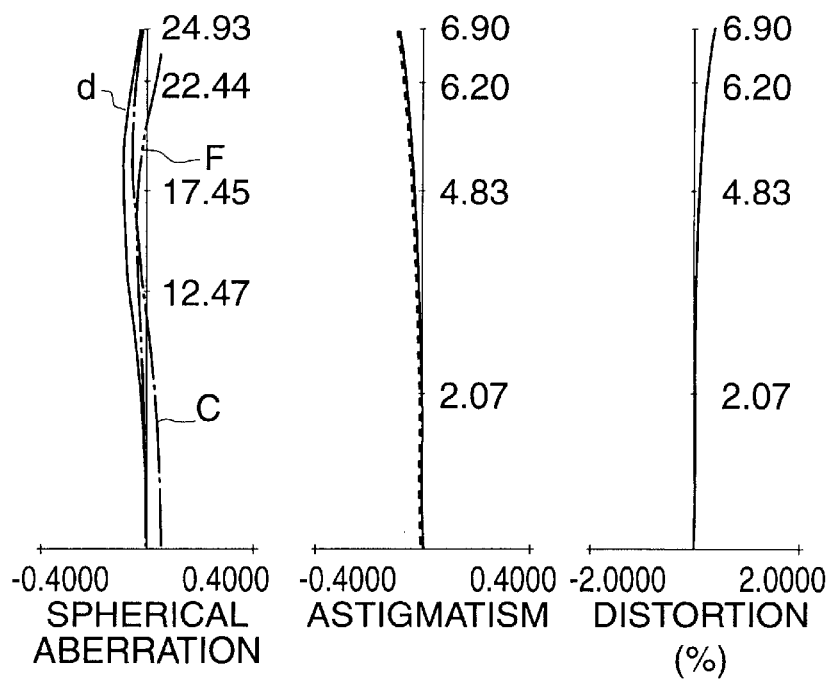
FIGS. 29A to 29C are aberration diagrams showing the various aberrations occurring in the objective lens according to the numerical example 14.
Figure 30:
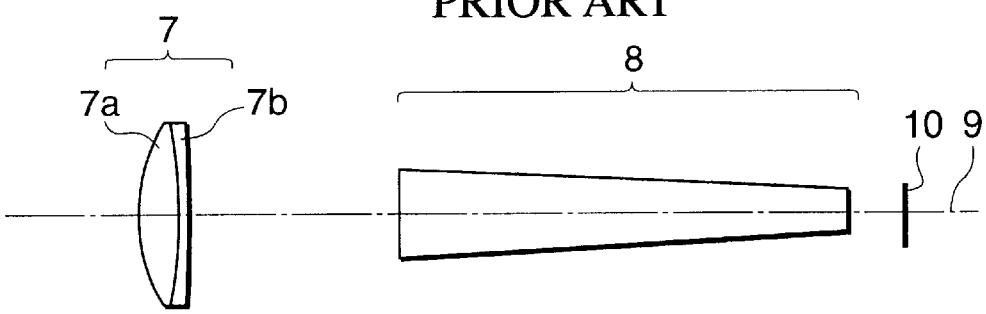
FIG. 30 is a lens sectional view showing a conventional objective lens.
Figure 31:
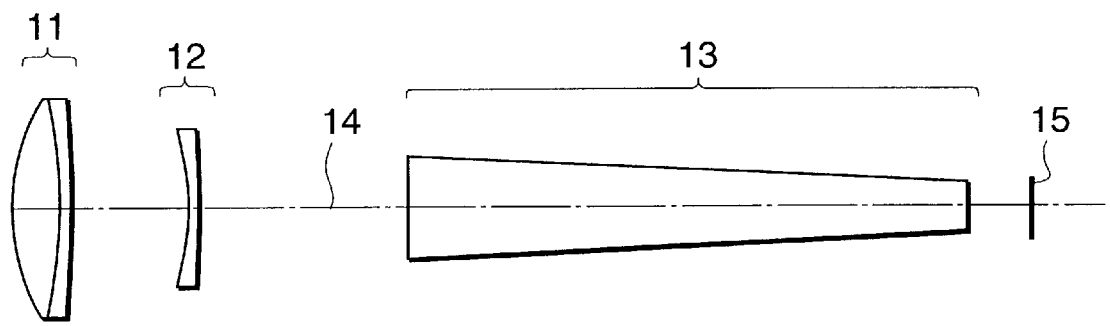
FIG. 31 is a lens sectional view showing another conventional objective lens.

FIGS. 24A to 24C are aberration diagrams showing the various aberrations occurring in the objective lens according to the numerical example 9. FIGS. 25A to 25C are aberration diagrams showing the various aberrations occurring in the objective lens according to the numerical example 10. FIGS. 26A to 26C are aberration diagrams showing the various aberrations occurring in the objective lens according to the numerical example 11. FIGS. 27A to 27C are aberration diagrams showing the various aberrations occurring in the objective lens according to the numerical example 12. FIGS. 28A to 28C are aberration diagrams showing the various aberrations occurring in the objective lens according to the numerical example 13. FIGS. 29A to 29C are aberration diagrams showing the various aberrations occurring in the objective lens according to the numerical example 14.

In FIGS. 18 to 23, reference numeral 1 denotes a first lens unit of positive refractive power, reference numeral 2 denotes a second lens unit of negative refractive power, reference numeral 3 denotes a variable angle prism disposed, according to necessity, for the purpose of effecting an image-stabilizing function for correcting the shaking of an observation image when the objective lens vibrates, and arranged to deflect incident light and cause the deflected light to exit therefrom, and reference numeral 4 denotes an image erecting prism serving as an image inverting means, which is composed of, for example, a known Porro prism or a known Pechan roof prism. Reference numeral 5 denotes an optical axis, and reference numeral 6 denotes an image plane on which an erecting object image is formed.

The objective lens according to the fourth embodiment is basically constructed with, in order from the object side to the image side, the first lens unit 1 of positive refractive power and the second lens unit 2 of negative refractive power. The first lens unit 1 consists of a single lens of positive refractive power, and the second lens unit 2 consists of a positive lens and a negative lens.

In the case of an embodiment set forth in the above-mentioned Japanese Patent Publication No. Sho 63-55045, an objective lens is constructed with a first lens unit of positive refractive power and a second lens unit of negative refractive power, the first lens unit consists of a cemented lens composed of one positive lens and one negative lens, and the second lens unit consists of one negative lens.

If, with the above construction kept, the F-number is intended to be made smaller for attaining a brighter lens system, a refractive power of the positive lens of the first lens unit becomes larger than a refractive power of the whole first lens unit, so that spherical aberration is caused by the positive lens of the first lens unit to occur largely in an under direction.

On the other hand, according to the fourth embodiment, as described above, the objective lens is constructed with, in order from the object side to the image side, the first lens unit 1 of positive refractive power and the second lens unit 2 of negative refractive power, the first lens unit 1 consists of a single lens of positive refractive power, and the second lens unit 2 consists of a positive lens and a negative lens. Accordingly, a refractive power of the positive lens of the first lens unit 1 is made small by making achromatism not effected by the first lens unit 1, thereby preventing spherical aberration in an under direction from occurring.

Then, the objective lens according to the fourth embodiment is made to have good optical performance by adopting the following construction.

(B-1) In accordance with a first aspect, in addition to the basic construction, the following conditions are satisfied:

$$0.5 \leq f1o/fo \leq 0.9 \qquad (13)$$

$$1.1 \leq -f2o/fo \leq 2.5 \qquad (14)$$

$$0.1 \leq D12o/fo \leq 0.2 \qquad (15)$$

where fo is the focal length of the entire objective lens, f1o is the focal length of the first lens unit 1, f2o is the focal length of the second lens unit 2, and D12o is an air interval between the first lens unit 1 and the second lens unit 2.

(B-2) In accordance with a second aspect, in addition to the basic construction, the following conditions are satisfied:

$$0.5 \leq f1o/fo \leq 0.9 \qquad (13)$$

$$1.1 \leq -f2o/fo \leq 2.5 \qquad (14)$$

$$1.6 \leq Np \qquad (16)$$

where fo is the focal length of the entire objective lens, f1o is the focal length of the first lens unit 1, f2o is the focal length of the second lens unit 2, and Np is a refractive index of material of the erecting prism 4.

Next, the technical significance of each of the above conditions (13) to (16) is described. The condition (13) is provided for setting limits to the ratio of the focal length of the first lens unit 1 to the focal length of the entire objective lens. In such a range as to exceed the lower limit of the condition (13), a refractive power of the first lens unit 1 becomes too strong, so that it becomes difficult to correct well spherical aberration. In such a range as to exceed the upper limit of the condition (13), it becomes difficult to reduce the size of the whole objective lens.

The condition (14) is provided for setting limits to the ratio of the focal length of the second lens unit 2 to the focal length of the entire objective lens. In such a range as to exceed the lower limit of the condition (14), a refractive power of the second lens unit 2 becomes too strong, so that it becomes difficult to correct well aberrations, such as spherical aberration and curvature of field. In such a range as to exceed the upper limit of the condition (14), it becomes difficult to reduce the size of the whole objective lens.

The condition (15) is provided for setting limits to the ratio of the air interval D12o between the first lens unit 1 and the second lens unit 2 to the focal length of the entire objective lens, so as to attain the reduction in size of the whole objective lens. If the lower limit of the condition (15) is exceeded, the first lens unit 1 and the second lens unit 2 come too close to each other, so that, in order to obtain a desired telephoto ratio, it becomes necessary to strengthen a refractive power of each lens unit, thereby increasing the sensitivity of longitudinal decentering coma with respect to the interval D12o. Further, if the upper limit of the condition (15) is exceeded, as the interval D12o increases, a unit of the objective lens becomes large, thereby causing an increase in weight. Further, since an interval between the second lens unit 2 and the image plane 6 decreases, it becomes difficult to dispose the variable angle prism 3 arranged to deflect light.

The condition (16) is concerned with the total length of the erecting prism 4 serving as an image inverting means. If the F-number of the objective lens is intended to be made smaller for attaining a brighter lens system, the effective diameter of a light beam entering the erecting prism 4 becomes large, so that the total length of the erecting prism 4 also disadvantageously becomes long proportionally.

Therefore, the refractive index of material of the erecting prism 4 is heightened as indicated in the range set forth in the condition (16), so that it is possible to shorten the optical path length obtained by converting the optical path of the erecting prism 4 in terms of air. As a result, it is possible to make smaller the effective diameter of the erecting prism 4 on the object side, thereby reducing the size of the erecting prism 4.

In the objective lens according to the fourth embodiment, the various factors are decided as described above so as to attain a bright lens system in terms of F-number of the objective lens and to obtain good optical performance while attaining the reduction in size of the objective lens. Then, in order to secure better optical performance, it is preferable to satisfy at least one of the following conditions.

(C-1) The second lens unit 2 is constructed with, in order from the object side to the image side, a positive lens having a convex surface facing the object side, and a negative lens.

With the second lens unit 2 composed of lens units of positive and negative refractive powers, respectively, in this order from the object side, the position of a principal point of the second lens unit 2 comes near to the image side, so that it becomes easy to secure a space in which the variable angle prism 3, the erecting prism 4, etc., are disposed. In addition, since achromatism is effected at the second lens unit 2, a refractive power of each lens is heightened. However, since such an arrangement is adopted that rays of light converging toward the optical axis are made incident on the first lens surface of the second lens unit 2 almost perpendicularly thereto, spherical aberration in an under direction is prevented from occurring.

(C-2) The following conditions are satisfied:

$$\nu 1+ \geq 60 \qquad (17)$$

$$\nu 2+ \geq 60 \qquad (18)$$

where $\nu 1+$ is an Abbe number of material of the positive lens of the first lens unit 1, and $\nu 2+$ is an Abbe number of material of the positive lens included in the second lens unit 2.

The conditions (17) and (18) are provided for correcting well the various aberrations, mainly, longitudinal chromatic aberration appearing on the optical axis, by utilizing dispersion of glass of each lens. If the lower limit of the condition (17) is exceeded, since the first lens unit 1 is composed of one positive lens, chromatic aberration occurs greatly, so that it becomes difficult to correct chromatic aberration at the second lens unit 2.

If the lower limit of the condition (18) is exceeded, since achromatism is effected at the second lens unit 2, it becomes difficult to correct chromatic aberration.

(C-3) The following condition is satisfied:

$$0.5 < (R_{12}+R_{11})/(R_{12}-R_{11}) < 1.0 \qquad (19)$$

where $R_{11}$ and $R_{12}$ are radii of curvature of surfaces on the object side and the image side, respectively, of the positive lens of the first lens unit 1.

The condition (19) is concerned mainly with spherical aberration. While a refractive power of the positive lens of the first lens unit 1 is determined by the condition (13), the lens shape of the positive lens is also determined by the condition (19), so that spherical aberration occurring at the first lens unit 1 is kept small.

(C-4) The following condition is satisfied:

$$|\Delta n| \geq 0.2 \qquad (20)$$

where $\Delta n$ is a difference between refractive indices of materials of the positive lens and the negative lens of the second lens unit 2.

The condition (20) is concerned mainly with spherical aberration and chromatic aberration. Since achromatism is effected at the second lens unit 2, a refractive power of each lens is heightened. However, if the lower limit of the condition (20) is exceeded, as the refractive index of the negative lens becomes small, the radius of curvature of the negative lens also becomes small. Accordingly, spherical aberration occurring at the first lens unit 1 is disadvantageously caused to be overcorrected.

(C-5) The positive lens and the negative lens of the second lens unit 2 constitute a cemented lens.

If the second lens unit 2 is not a cemented lens, three lenses, counting in the positive lens of the first lens unit 1, exist separately in the objective lens. In the case of the telephoto type, since the second lens unit having a negative refractive power for enlarging the focal length of the entire objective lens is away from the first lens unit having a positive refractive power, the sensitivity due to the decentration of a lens becomes higher, so that a structural arrangement for holding the lens is required to have high accuracy. Therefore, it is preferred that the second lens unit 2 is made to be a cemented lens, causing the objective lens to be composed substantially of two lenses, for the purpose of lowering the sensitivity due to decentration.

(C-6) The following condition is satisfied:

$$0.5 < -R_{22}/fo < 1.5 \qquad (21)$$

where $R_{22}$ is a radius of curvature of a cementing surface of the cemented lens composed of the positive lens and the negative lens of the second lens unit 2.

The condition (21) is concerned mainly with spherical aberration and chromatic aberration. Since achromatism is effected at the second lens unit 2, a refractive power of each lens is heightened. However, if the lower limit of the condition (21) is exceeded, as a radius of curvature of the negative lens becomes small, spherical aberration occurring at the first lens unit 1 is disadvantageously caused to be overcorrected. Further, if the upper limit of the condition (21) is exceeded, spherical aberration occurring at the first lens unit 1 is disadvantageously caused to be insufficiently corrected.

(C-7) It is preferable that the variable angle prism 3 arranged to deflect light so as to effect the image-stabilizing function is disposed at a place where the effective diameter of a light flux is small. By this arrangement, it is possible to reduce the size of the variable angle prism 3. Further, it is desirable that the variable angle prism 3 is disposed between the second lens unit 2 and the image erecting prism 4, for the reason that the variable angle prism 3 hardly influences the deterioration of optical performance of the objective lens.

Next, numerical data of the numerical examples 1 to 14 of the eyepiece lens, the telescope and the objective lens according to the invention are shown.

In the numerical data of the numerical examples 1 to 14, Ri denotes the radius of curvature of the i-th surface, when counted from the object side (entrance side), Di denotes the interval between the i-th surface and the (i+1)th surface, when counted from the object side (entrance side), Ni and νi respectively denote the refractive index and Abbe number of the i-th optical member, when counted from the object side (entrance side). The last surface in each of the numerical examples 1 to 6, corresponding to the eyepiece lens, is an eye point. A plurality of plane surfaces in the middle of an optical path of each of the numerical examples 7 and 8, corresponding to the telescope, are surfaces constituting the variable angle prism. A plurality of plane surfaces in the last stage of an optical path of each of the numerical examples 9 to 14, corresponding to the objective lens, are surfaces constituting the variable angle prism. In addition, the values of the factors in the above-mentioned conditions (1) to (21) for the numerical examples 1 to 14 are listed in Table-1, Table-2 and Table-3.

<Numerical Example 1>

| f = 11.96471 | Pupil diameter φ = 3.3 | | 2ω = 66° |
|---|---|---|---|
| R 1 = −11.315 | D 1 = 1.00 | N 1 = 1.48749 | ν 1 = 70.2 |
| R 2 = 33.749 | D 2 = 2.15 | | |
| R 3 = −27.454 | D 3 = 4.35 | N 2 = 1.83400 | ν 2 = 37.2 |
| R 4 = −11.850 | D 4 = 9.50 | | |
| R 5 = −17.426 | D 5 = 1.30 | N 3 = 1.84666 | ν 3 = 23.8 |
| R 6 = 197.696 | D 6 = 8.00 | N 4 = 1.69680 | ν 4 = 55.5 |
| R 7 = −17.580 | D 7 = 0.20 | | |
| R 8 = ∞ | D 8 = 4.35 | N 5 = 1.69680 | ν 5 = 55.5 |
| R 9 = −35.760 | D 9 = 0.20 | | |
| R10 = 25.434 | D10 = 1.40 | N 6 = 1.80518 | ν 6 = 25.4 |
| R11 = 16.518 | D11 = 7.55 | N 7 = 1.69680 | ν 7 = 55.5 |
| R12 = −171.524 | D12 = 15.00 (Eye Relief) | | |
| R13 = ∞ (Pupil) | | | |

<Numerical Example 2>

| f = 11.98742 | Pupil diameter φ = 3.3 | | 2ω = 66° |
|---|---|---|---|
| R 1 = −11.733 | D 1 = 1.00 | N 1 = 1.48749 | ν 1 = 70.2 |
| R 2 = 26.846 | D 2 = 2.60 | | |
| R 3 = −25.874 | D 3 = 4.45 | N 2 = 1.83400 | ν 2 = 37.2 |
| R 4 = −11.737 | D 4 = 9.50 | | |
| R 5 = −18.663 | D 5 = 1.30 | N 3 = 1.84666 | ν 3 = 23.8 |
| R 6 = −128.586 | D 6 = 7.35 | N 4 = 1.69680 | ν 4 = 55.5 |
| R 7 = −17.430 | D 7 = 0.20 | | |
| R 8 = ∞ | D 8 = 3.90 | N 5 = 1.69680 | ν 5 = 55.5 |
| R 9 = −42.306 | D 9 = 0.20 | | |
| R10 = 25.555 | D10 = 1.30 | N 6 = 1.84666 | ν 6 = 23.8 |
| R11 = 15.719 | D11 = 8.20 | N 7 = 1.69680 | ν 7 = 55.5 |
| R12 = −120.567 | D12 = 15.00 (Eye Relief) | | |
| R13 = ∞ (Pupil) | | | |

<Numerical Example 3>

| f = 10.00252 | Pupil diameter φ = 2.8 | | 2ω = 65° |
|---|---|---|---|
| R 1 = −9.411 | D 1 = 1.00 | N 1 = 1.71300 | ν 1 = 53.9 |
| R 2 = 42.389 | D 2 = 1.37 | | |
| R 3 = −33.036 | D 3 = 5.05 | N 2 = 1.83400 | ν 2 = 37.2 |
| R 4 = −10.165 | D 4 = 9.50 | | |
| R 5 = −16.254 | D 5 = 1.30 | N 3 = 1.84666 | ν 3 = 23.8 |
| R 6 = 67.950 | D 6 = 8.70 | N 4 = 1.69680 | ν 4 = 55.5 |
| R 7 = −16.437 | D 7 = 0.20 | | |
| R 8 = 137.517 | D 8 = 4.55 | N 5 = 1.69680 | ν 5 = 55.5 |
| R 9 = −43.351 | D 9 = 0.20 | | |
| R10 = 24.359 | D10 = 1.40 | N 6 = 1.80518 | ν 6 = 25.4 |
| R11 = 16.048 | D11 = 6.55 | N 7 = 1.69680 | ν 7 = 55.5 |
| R12 = −210.073 | D12 = 15.00 (Eye Relief) | | |
| R13 = ∞ (Pupil) | | | |

<Numerical Example 4>

| f = 13.84480 | Pupil diameter φ = 3.8 | | 2ω = 60° |
|---|---|---|---|
| R 1 = −12.013 | D 1 = 1.00 | N 1 = 1.48749 | ν 1 = 70.2 |
| R 2 = 32.863 | D 2 = 2.19 | | |
| R 3 = −31.322 | D 3 = 4.46 | N 2 = 1.83400 | ν 2 = 37.2 |
| R 4 = −12.238 | D 4 = 12.50 | | |
| R 5 = −21.078 | D 5 = 1.30 | N 3 = 1.84666 | ν 3 = 23.8 |
| R 6 = −52.922 | D 6 = 6.71 | N 4 = 1.69680 | ν 4 = 55.5 |
| R 7 = −16.986 | D 7 = 0.20 | | |
| R 8 = −559.895 | D 8 = 3.18 | N 5 = 1.69680 | ν 5 = 55.5 |
| R 9 = −49.362 | D 9 = 0.20 | | |
| R10 = 24.420 | D10 = 1.30 | N 6 = 1.84666 | ν 6 = 23.8 |
| R11 = 14.585 | D11 = 6.96 | N 7 = 1.69680 | ν 7 = 55.5 |
| R12 = 737.404 | D12 = 15.00 (Eye Relief) | | |
| R13 = ∞ (Pupil) | | | |

<Numerical Example 5>

| f = 14.94122 | Pupil diameter φ = 4.2 | | 2ω = 55° |
|---|---|---|---|
| R 1 = −13.363 | D 1 = 1.00 | N 1 = 1.48749 | ν 1 = 70.2 |
| R 2 = 52.005 | D 2 = 1.81 | | |
| R 3 = −31.480 | D 3 = 4.07 | N 2 = 1.83400 | ν 2 = 37.2 |
| R 4 = −13.021 | D 4 = 12.50 | | |
| R 5 = −23.200 | D 5 = 1.30 | N 3 = 1.84666 | ν 3 = 23.8 |
| R 6 = −130.329 | D 6 = 8.08 | N 4 = 1.69680 | ν 4 = 55.5 |
| R 7 = −17.203 | D 7 = 0.20 | | |
| R 8 = 2550.519 | D 8 = 3.64 | N 5 = 1.69680 | ν 5 = 55.5 |
| R 9 = −51.706 | D 9 = 0.20 | | |
| R10 = 22.705 | D10 = 1.30 | N 6 = 1.84666 | ν 6 = 23.8 |
| R11 = 14.314 | D11 = 5.90 | N 7 = 1.69680 | ν 7 = 55.5 |
| R12 = 81.782 | D12 = 15.00 (Eye Relief) | | |
| R13 = ∞ (Pupil) | | | |

<Numerical Example 6>

| f = 11.99893 | Pupil diameter φ = 3.3 | | 2ω = 65° |
|---|---|---|---|
| R 1 = −9.425 | D 1 = 1.20 | N 1 = 1.48749 | ν 1 = 70.2 |
| R 2 = 57.081 | D 2 = 1.32 | | |
| R 3 = −51.131 | D 3 = 5.20 | N 2 = 1.83400 | ν 2 = 37.2 |
| R 4 = −12.374 | D 4 = 11.62 | | |
| R 5 = −17.221 | D 5 = 1.50 | N 3 = 1.84666 | ν 3 = 23.8 |
| R 6 = 53.492 | D 6 = 8.90 | N 4 = 1.69680 | ν 4 = 55.5 |
| R 7 = −17.259 | D 7 = 0.20 | | |
| R 8 = 102.904 | D 8 = 4.32 | N 5 = 1.69680 | ν 5 = 55.5 |
| R 9 = −47.958 | D 9 = 0.20 | | |

-continued

<Numerical Example 6>

| | | | |
|---|---|---|---|
| R10 = 19.701 | D10 = 5.04 | N 6 = 1.69680 | ν 6 = 55.5 |
| R11 = 85.264 | D11 = 15.00 (Eye Relief) | | |
| R12 = ∞ (Pupil) | | | |

<Numerical Example 7>

Magnification = 14.67x   Pupil diameter φ = 3.3   2ω = 4.4°

| | | | |
|---|---|---|---|
| R 1 = 65.797 | D 1 = 7.15 | N 1 = 1.48749 | ν 1 = 70.2 |
| R 2 = −436.543 | D 2 = 24.72 | | |
| R 3 = 44.901 | D 3 = 7.75 | N 2 = 1.49700 | ν 2 = 81.5 |
| R 4 = −115.190 | D 4 = 1.85 | N 3 = 1.80400 | ν 3 = 46.6 |
| R 5 = 55.979 | D 5 = 15.16 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 40.00 | | |
| R10 = ∞ | D10 = 75.50 | N 7 = 1.65844 | ν 7 = 50.9 |
| R11 = ∞ | D11 = 3.50 | | |
| R12 = −11.315 | D12 = 1.00 | N 8 = 1.48749 | ν 8 = 70.2 |
| R13 = 33.749 | D13 = 2.15 | | |
| R14 = −27.454 | D14 = 4.35 | N 9 = 1.83400 | ν 9 = 37.2 |
| R15 = −11.850 | D15 = 9.50 | | |
| R16 = −17.426 | D16 = 1.30 | N10 = 1.84666 | ν10 = 23.8 |
| R17 = 197.696 | D17 = 8.00 | N11 = 1.69680 | ν11 = 55.5 |
| R18 = −17.580 | D18 = 0.20 | | |
| R19 = ∞ | D19 = 4.35 | N12 = 1.69680 | ν12 = 55.5 |
| R20 = −35.760 | D20 = 0.20 | | |
| R21 = 25.434 | D21 = 1.40 | N13 = 1.80518 | ν13 = 25.4 |
| R22 = 16.518 | D22 = 7.55 | N14 = 1.69680 | ν14 = 55.5 |
| R23 = −171.524 | D23 = 15.00 | | |
| R24 = ∞ | | | |

<Numerical Example 8>

Magnification = 17.55x   Pupil diameter φ = 2.8   2ω = 3.7°

| | | | |
|---|---|---|---|
| R 1 = 65.797 | D 1 = 7.15 | N 1 = 1.48749 | ν 1 = 70.2 |
| R 2 = −436.543 | D 2 = 24.72 | | |
| R 3 = 44.901 | D 3 = 7.75 | N 2 = 1.49700 | ν 2 = 81.5 |
| R 4 = −115.190 | D 4 = 1.85 | N 3 = 1.80400 | ν 3 = 46.6 |
| R 5 = 55.979 | D 5 = 15.16 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 40.00 | | |
| R10 = ∞ | D10 = 75.50 | N 7 = 1.65844 | ν 7 = 50.9 |
| R11 = ∞ | D11 = 3.93 | | |
| R12 = −9.411 | D12 = 1.00 | N 8 = 1.71300 | ν 8 = 53.9 |
| R13 = 42.389 | D13 = 1.37 | | |
| R14 = −33.036 | D14 = 5.05 | N 9 = 1.83400 | ν 9 = 37.2 |
| R15 = −10.165 | D15 = 9.50 | | |
| R16 = −16.254 | D16 = 1.30 | N10 = 1.84666 | ν10 = 23.8 |
| R17 = 67.950 | D17 = 8.70 | N11 = 1.69680 | ν11 = 55.5 |
| R18 = −16.437 | D18 = 0.20 | | |
| R19 = 137.517 | D19 = 4.55 | N12 = 1.69680 | ν12 = 55.5 |
| R20 = −43.351 | D20 = 0.20 | | |
| R21 = 24.359 | D21 = 1.40 | N13 = 1.80518 | ν13 = 25.4 |
| R22 = 16.048 | D22 = 6.55 | N14 = 1.69680 | ν14 = 55.5 |
| R23 = −210.073 | D23 = 15.00 | | |
| R24 = ∞ | | | |

<Numerical Example 9> f = 175.57747   Fno = 1:3.6   2ω = 4.5°

| | | | |
|---|---|---|---|
| R 1 = 65.797 (Stop) | D 1 = 7.15 | N 1 = 1.48749 | ν 1 = 70.2 |
| R 2 = −436.543 | D 2 = 24.72 | | |

-continued

<Numerical Example 9>

| | | | |
|---|---|---|---|
| R 3 = 44.901 | D 3 = 7.75 | N 2 = 1.49700 | ν 2 = 81.5 |
| R 4 = −115.190 | D 4 = 1.85 | N 3 = 1.80400 | ν 3 = 46.6 |
| R 5 = 55.979 | D 5 = 15.16 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 40.00 | | |
| R10 = ∞ | D10 = 75.50 | N 7 = 1.65844 | ν 7 = 50.9 |
| R11 = ∞ | | | |

<Numerical Example 10> f = 179.89969   Fno = 1:3.6   2ω = 44°

| | | | |
|---|---|---|---|
| R 1 = 82.346 (Stop) | D 1 = 6.10 | N 1 = 1.48749 | ν 1 = 70.2 |
| R 2 = −352.796 | D 2 = 27.10 | | |
| R 3 = 48.956 | D 3 = 7.15 | N 2 = 1.43875 | ν 2 = 95.0 |
| R 4 = −184.222 | D 4 = 1.85 | N 3 = 1.78800 | ν 3 = 47.4 |
| R 5 = 74.501 | D 5 = 11.41 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 45.00 | | |
| R10 = ∞ | D10 = 85.00 | N 7 = 1.65844 | ν 7 = 50.9 |
| R11 = ∞ | | | |

<Numerical Example 11> f = 180.11269   Fno = 1:3.6   2ω = 4.4°

| | | | |
|---|---|---|---|
| R 1 = 73.406 (Stop) | D 1 = 7.10 | N 1 = 1.49700 | ν 1 = 81.5 |
| R 2 = −526.770 | D 2 = 26.74 | | |
| R 3 = 71.657 | D 3 = 6.85 | N 2 = 1.49700 | ν 2 = 81.5 |
| R 4 = −98.110 | D 4 = 1.85 | N 3 = 1.77250 | ν 3 = 49.6 |
| R 5 = 98.110 | D 5 = 11.02 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 45.00 | | |
| R10 = ∞ | D10 = 85.00 | N 7 = 1.65844 | ν 7 = 50.9 |
| R11 = ∞ | | | |

<Numerical Example 12> f = 180.86736   Fno = 1:3.6   2ω = 44°

| | | | |
|---|---|---|---|
| R 1 = 77.833 (Stop) | D 1 = 7.59 | N 1 = 1.49700 | ν 1 = 81.5 |
| R 2 = −685.289 | D 2 = 26.71 | | |
| R 3 = 53.971 | D 3 = 7.43 | N 2 = 1.49700 | ν 2 = 81.5 |
| R 4 = −120.657 | D 4 = 1.00 | | |
| R 5 = −118.813 | D 5 = 1.85 | N 3 = 1.77250 | ν 3 = 49.6 |
| R 6 = 73.147 | D 6 = 7.92 | | |
| R 7 = ∞ | D 7 = 1.60 | N 4 = 1.51633 | ν 4 = 64.1 |
| R 8 = ∞ | D 8 = 3.80 | N 5 = 1.41650 | ν 5 = 52.2 |
| R 9 = ∞ | D 9 = 1.60 | N 6 = 1.51633 | ν 6 = 64.1 |
| R10 = ∞ | D10 = 54.00 | | |
| R11 = ∞ | D12 = 75.50 | N 7 = 1.65844 | ν 7 = 50.9 |
| R12 = ∞ | | | |

<Numerical Example 13> f = 179.99319   Fno = 1:3.6   2ω = 44°

| | | | |
|---|---|---|---|
| R 1 = 81.142 (Stop) | D 1 = 7.07 | N 1 = 1.43875 | ν 1 = 95.0 |
| R 2 = −306.254 | D 2 = 27.44 | | |

-continued

<Numerical Example 13>

| | | | |
|---|---|---|---|
| R 3 = 49.923 | D 3 = 7.85 | N 2 = 1.51633 | ν 2 = 64.1 |
| R 4 = −167.980 | D 4 = 1.85 | N 3 = 1.78800 | ν 3 = 47.4 |
| R 5 = 62.241 | D 5 = 9.50 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 46.00 | | |
| R10 = ∞ | D10 = 85.00 | N 7 = 1.65844 | ν 7 = 50.9 |
| R11 = ∞ | | | |

<Numerical Example 14>

| | | | |
|---|---|---|---|
| f = 179.49896 | Fno = 1:3.6 | 2ω = 4.4° | |
| R 1 = 83.234 (Stop) | D 1 = 6.52 | N 1 = 1.51633 | ν 1 = 64.1 |
| R 2 = −314.506 | D 2 = 23.19 | | |
| R 3 = 41.180 | D 3 = 7.35 | N 2 = 1.43875 | ν 2 = 95.0 |
| R 4 = −242.457 | D 4 = 1.85 | N 3 = 1.80400 | ν 3 = 46.6 |
| R 5 = 58.085 | D 5 = 9.50 | | |
| R 6 = ∞ | D 6 = 1.60 | N 4 = 1.51633 | ν 4 = 64.1 |
| R 7 = ∞ | D 7 = 3.80 | N 5 = 1.41650 | ν 5 = 52.2 |
| R 8 = ∞ | D 8 = 1.60 | N 6 = 1.51633 | ν 6 = 64.1 |
| R 9 = ∞ | D 9 = 46.00 | | |
| R10 = ∞ | D10 = 85.00 | N 7 = 1.65844 | ν 7 = 50.9 |
| R11 = ∞ | | | |

TABLE 1

(Eyepiece Lens)

| | Numerical Example | | | | | |
|---|---|---|---|---|---|---|
| Condition | 1 | 2 | 3 | 4 | 5 | 6 |
| (1) | 0.045 | 0.033 | 0.010 | 0.087 | 0.093 | 0.141 |
| (2) | 1.286 | 1.357 | 1.493 | 1.215 | 1.115 | 1.118 |
| (3) | 4.289 | 5.065 | 4.778 | 5.597 | 4.870 | 3.960 |
| (4) | 2.905 | 2.897 | 3.404 | 3.032 | 3.414 | 2.971 |
| (5) | 0.459 | 0.423 | 0.507 | 0.361 | 0.334 | 0.593 |
| (6) | 0.794 | 0.793 | 0.950 | 0.903 | 0.836 | 0.968 |
| (7) | 0.498 | 0.392 | 0.637 | 0.465 | 0.591 | 0.717 |
| (8) | −2.519 | −2.661 | −1.889 | −2.283 | −2.411 | −1.638 |
| (9) | −1 | −1 | −0.521 | −1.193 | −0.960 | −0.364 |
| (10) | 0.061 | −0.093 | 0.147 | −0.262 | −0.115 | 0.224 |
| (11) | 1.6968 | 1.6968 | 1.6968 | 1.6968 | 1.6968 | 1.6968 |

TABLE 2

(Telescope)

| | Numerical Example | |
|---|---|---|
| Condition | 7 | 8 |
| (12) | 1.65844 | 1.65844 |

TABLE 3

(Objective Lens)

| | Numerical Example | | | |
|---|---|---|---|---|
| Condition | 9 | 10 | 11 | 12 |
| (13) | 0.67 | 0.76 | 0.72 | 0.78 |
| (14) | 1.17 | 1.93 | 1.65 | 1.95 |

TABLE 3-continued

| | | | | |
|---|---|---|---|---|
| (15) | 0.14 | 0.15 | 0.15 | 0.15 |
| (16) | 1.658441 | 1.658441 | 1.658441 | 1.658441 |
| (17) | 70.23 | 70.23 | 81.54 | 81.54 |
| (18) | 81.54 | 94.99 | 81.54 | 81.54 |
| (19) | 0.74 | 0.62 | 0.76 | 0.8 |
| (20) | 0.307 | 0.349 | 0.276 | 0.276 |
| (21) | 0.66 | 1.02 | 0.54 | — |

| | Numerical Example | |
|---|---|---|
| | 13 | 14 |
| (13) | 0.82 | 0.71 |
| (14) | 2.38 | 1.49 |
| (15) | 0.15 | 0.13 |
| (16) | 1.658441 | 1.658441 |
| (17) | 94.99 | 64.14 |
| (18) | 64.14 | 94.99 |
| (19) | 0.58 | 0.58 |
| (20) | 0.272 | 0.365 |
| (21) | 0.93 | 1.35 |

What is claimed is:

1. An objective lens comprising, in order from an object side to an image side:

a first lens unit of positive refractive power, said first lens unit consisting of one positive lens; and a second lens unit of negative refractive power, said second lens unit consisting of one positive lens and one negative lens, wherein said objective lens satisfies the following conditions:

$$0.5 \leq f1o/fo \leq 0.9$$

$$1.1 \leq -f2o/fo \leq 2.5$$

$$0.1 \leq D12o/fo \leq 0.2$$

where fo is the focal length of the entirety of said objective lens, f1o is the focal length of said first lens unit, f2o is the focal length of said second lens unit, and D12o is an interval between said first lens unit and said second lens unit.

2. An objective lens according to claim 1, wherein said second lens unit consists of, in order from the object side to the image side, a positive lens having a convex surface facing the object side, and a negative lens.

3. An objective lens according to claim 1, wherein said objective lens satisfies the following conditions:

$$\nu 1+ \geq 60$$

$$\nu 2+ \geq 60$$

where $\nu 1+$ is an Abbe number of material of the positive lens of said first lens unit, and $\nu 2+$ is an Abbe number of material of the positive lens included in said second lens unit.

4. An objective lens according to claim 1, wherein said objective lens satisfies the following condition:

$$0.5 < (R_{12}+R_{11})/(R_{12}-R_{11}) < 1.0$$

where $R_{11}$ and $R_{12}$ are radii of curvature of surfaces on the object side and the image side, respectively, of the positive lens of said first lens unit.

5. An objective lens according to claim 1, wherein said objective lens satisfies the following condition:

$$|\Delta n| \geq 0.2$$

where $\Delta n$ is a difference between refractive indices of materials of the positive lens and the negative lens of said second lens unit.

6. An objective lens according to claim 1, wherein said second lens unit consists of a cemented lens composed of a positive lens and a negative lens.

7. An objective lens according to claim 6, wherein said objective lens satisfies the following condition:

$$0.5 < -R_{22}/fo < 1.5$$

where $R_{22}$ is a radius of curvature of a cementing surface of the cemented lens of said second lens unit.

8. An optical apparatus comprising:
an objective lens according to claim 1.

9. An objective lens comprising, in order from an object side to an image side:
a first lens unit of positive refractive power, said first lens unit consisting of one positive lens;
a second lens unit of negative refractive power, said second lens unit consisting of one positive lens and one negative lens; and
an erecting prism for erecting an image,
wherein said objective lens satisfies the following conditions:

$$0.5 \leq f1o/fo \leq 0.9$$

$$1.1 \leq -f2o/fo \leq 2.5$$

$$1.6 \leq Np$$

where fo is the focal length of the entirety of said objective lens, f1o is the focal length of said first lens unit, f2o is the focal length of said second lens unit, and Np is a refractive index of material of said erecting prism.

10. An objective lens according to claim 9, wherein said second lens unit consists of, in order from the object side to the image side, a positive lens having a convex surface facing the object side, and a negative lens.

11. An objective lens according to claim 9, wherein said objective lens satisfies the following conditions:

$$v1+ \geq 60$$

$$v2+ \geq 60$$

where v1+ is an Abbe number of material of the positive lens of said first lens unit, and v2+ is an Abbe number of material of the positive lens included in said second lens unit.

12. An objective lens according to claim 9, wherein said objective lens satisfies the following condition:

$$0.5 < (R_{12}+R_{11})/(R_{12}-R_{11}) < 1.0$$

where $R_{11}$ and $R_{12}$ are radii of curvature of surfaces on the object side and the image side, respectively, of the positive lens of said first lens unit.

13. An objective lens according to claim 9, wherein said objective lens satisfies the following condition:

$$|\Delta n| \geq 0.2$$

where $\Delta n$ is a difference between refractive indices of materials of the positive lens and the negative lens of said second lens unit.

14. An objective lens according to claim 9, wherein said second lens unit consists of a cemented lens composed of a positive lens and a negative lens.

15. An objective lens according to claim 14, wherein said objective lens satisfies the following condition:

$$0.5 < -R_{22}/fo < 1.5$$

where $R_{22}$ is a radius of curvature of a cementing surface of the cemented lens of said second lens unit.

16. An optical apparatus comprising:
an objective lens according to claim 9.

* * * * *

UNITED STATES PATENT AND TRADEMARK OFFICE
CERTIFICATE OF CORRECTION

PATENT NO.   : 6,476,983 B2                                                Page 1 of 1
DATED        : November 5, 2002
INVENTOR(S)  : Hiroyuki Kodama et al.

It is certified that error appears in the above-identified patent and that said Letters Patent is hereby corrected as shown below:

<u>Column 22,</u>
Lines 17, 48 and 64, "44°" should read -- 4.4° --.

Signed and Sealed this

Nineteenth Day of August, 2003

JAMES E. ROGAN
*Director of the United States Patent and Trademark Office*